US010359117B2

(12) United States Patent
Prenger et al.

(10) Patent No.: US 10,359,117 B2
(45) Date of Patent: Jul. 23, 2019

(54) ASPIRATING FACE SEAL WITH NON-COILED RETRACTION SPRINGS

(71) Applicant: General Electric Company, Schenectady, NY (US)

(72) Inventors: Brian Joseph Prenger, Mason, OH (US); Richard Alan Wesling, Cincinnati, OH (US); Nathan Evan McCurdy Gibson, West Chester, OH (US); Ravindra Shankar Ganiger, Karnataka (IN); Narendra Anand Hardikar, Karnataka (IN); Anand Aravindrao Kulkarni, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/450,130

(22) Filed: Mar. 6, 2017

(65) Prior Publication Data
US 2018/0252317 A1  Sep. 6, 2018

(51) Int. Cl.
*F16J 15/447* (2006.01)
*F16J 15/02* (2006.01)
(Continued)

(52) U.S. Cl.
CPC ........... *F16J 15/447* (2013.01); *F01D 11/003* (2013.01); *F01D 11/02* (2013.01); *F01D 11/025* (2013.01);
(Continued)

(58) Field of Classification Search
CPC .... F16J 15/447; F16J 15/4472; F16J 15/4476; F16J 15/164; F01D 11/02; F05D 2220/31; F05D 2220/32; F04D 29/083
See application file for complete search history.

(56) References Cited

U.S. PATENT DOCUMENTS 2,545,916 A * 3/1951 Clark ................... F16J 15/4472
277/419
2,871,038 A * 1/1959 Comery ................. F01D 11/02
277/421

(Continued)

FOREIGN PATENT DOCUMENTS

EP  2020542 A1  4/2009

*Primary Examiner* — Eugene G Byrd
(74) *Attorney, Agent, or Firm* — Dority & Manning, P.A.

(57) ABSTRACT

Aspirating face seal between high and low pressure regions of turbomachine between rotatable and non-rotatable members of turbomachine includes gas bearing rotatable and non-rotatable face surfaces, non-rotatable face surface mounted on annular slider on non-rotatable member. Retracting means retracts annular slider away from rotatable member and non-rotatable face surface away from rotatable surface and includes circumferentially spaced apart non-coiled springs axially disposed between slider and non-rotatable engine member. Leaf springs may include first and second ends mounted or attached to first and second mounting lugs or tabs attached to non-rotatable member and slider respectively and middle portion between ends. Springs oriented for retracting slider if slider contacts rotatable member. Primary and starter seal teeth may be mounted on carrier on rotatable member. Primary seal tooth may be on non-rotatable member and starter seal tooth on rotatable member.

15 Claims, 23 Drawing Sheets

(51) Int. Cl.
*F01D 11/02* (2006.01)
*F04D 29/16* (2006.01)
*F04D 29/52* (2006.01)
*F01D 11/00* (2006.01)

(52) U.S. Cl.
CPC ......... *F04D 29/164* (2013.01); *F04D 29/526* (2013.01); *F16J 15/022* (2013.01); *F01D 11/001* (2013.01); *F05D 2260/38* (2013.01); *F05D 2260/52* (2013.01)

(56) References Cited

U.S. PATENT DOCUMENTS

| | | | | |
|---|---|---|---|---|
| 3,383,033 A * | 5/1968 | Moore | | F01D 11/001 415/111 |
| 3,501,245 A * | 3/1970 | Ivanko | | F01D 11/025 184/6.11 |
| 3,746,463 A * | 7/1973 | Stock | | F01D 9/047 415/136 |
| 4,103,905 A * | 8/1978 | Desmond | | F16J 15/4472 277/413 |
| 4,916,892 A * | 4/1990 | Pope | | F01D 11/003 277/305 |
| 4,928,978 A * | 5/1990 | Shaffer | | F01D 25/183 277/401 |
| 5,218,816 A * | 6/1993 | Plemmons | | F01D 11/02 277/419 |
| 5,284,347 A * | 2/1994 | Pope | | F01D 11/025 277/305 |
| 5,797,723 A * | 8/1998 | Frost | | F16J 15/0887 415/174.2 |
| 5,975,537 A | 11/1999 | Turnquist et al. | | |
| 6,145,840 A * | 11/2000 | Pope | | F16J 15/346 277/348 |
| 6,612,809 B2 * | 9/2003 | Czachor | | F01D 11/005 415/189 |
| 6,676,369 B2 * | 1/2004 | Brauer | | F01D 11/025 415/113 |
| 6,708,482 B2 | 3/2004 | Seda | | |
| 6,758,477 B2 * | 7/2004 | Brauer | | F01D 11/02 277/379 |
| 7,044,470 B2 | 5/2006 | Zheng | | |
| 7,797,941 B2 * | 9/2010 | Munsell | | F01D 11/04 60/726 |
| 8,109,716 B2 | 2/2012 | Glahn et al. | | |
| 8,109,717 B2 | 2/2012 | Glahn et al. | | |
| 8,167,545 B2 | 5/2012 | Glahn et al. | | |
| 8,272,643 B2 * | 9/2012 | Garrison | | F01D 11/001 277/348 |
| 8,387,991 B2 | 3/2013 | Durling | | |
| 8,439,365 B2 * | 5/2013 | Haynes | | F16J 15/441 277/371 |
| 8,740,224 B2 | 6/2014 | Zheng et al. | | |
| 9,353,647 B2 * | 5/2016 | Bordne | | F01D 25/18 |
| 9,512,922 B2 * | 12/2016 | Takeuchi | | F01D 11/001 |
| 9,567,908 B2 * | 2/2017 | Bordne | | F01D 25/125 |
| 9,726,031 B2 * | 8/2017 | Cusack | | F16J 15/3284 |
| 2004/0120807 A1 * | 6/2004 | Albers | | F01D 11/003 415/170.1 |
| 2007/0164516 A1 * | 7/2007 | Olsen | | F16J 15/164 277/347 |
| 2007/0253809 A1 | 11/2007 | Glynn et al. | | |
| 2008/0018054 A1 | 1/2008 | Herron et al. | | |
| 2008/0197575 A1 * | 8/2008 | El-Aini | | F01D 11/02 277/303 |
| 2008/0310953 A1 * | 12/2008 | Garrison | | F01D 11/025 415/173.2 |
| 2011/0229311 A1 * | 9/2011 | Varanasi | | F01D 11/005 415/170.1 |
| 2012/0251290 A1 | 10/2012 | Turnquist et al. | | |
| 2013/0285331 A1 * | 10/2013 | Kostka | | F01D 11/003 277/411 |
| 2015/0130138 A1 * | 5/2015 | Zheng | | F01D 11/003 277/307 |

\* cited by examiner

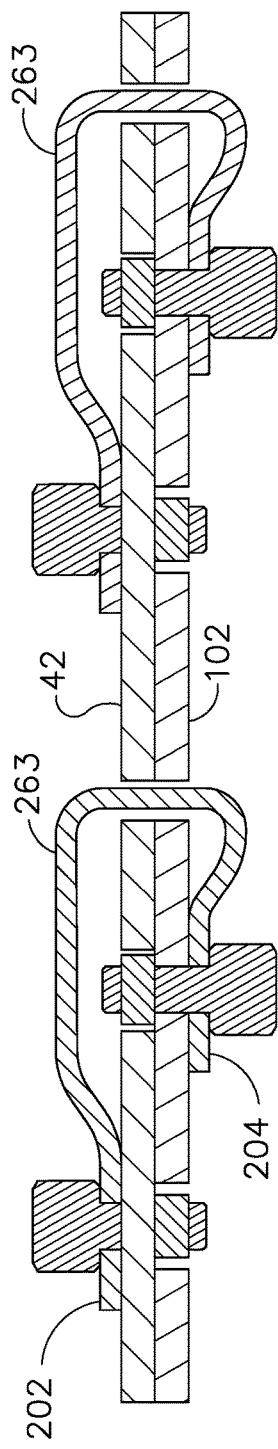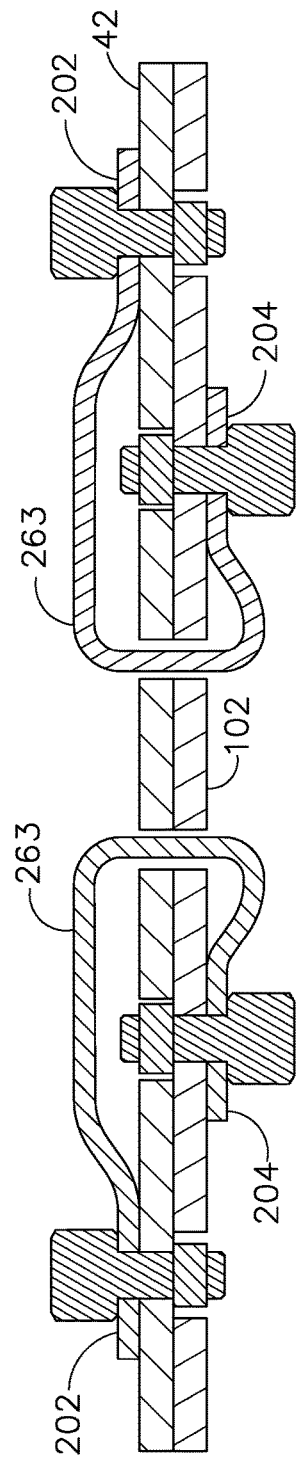
FIG. 13A
FIG. 13B

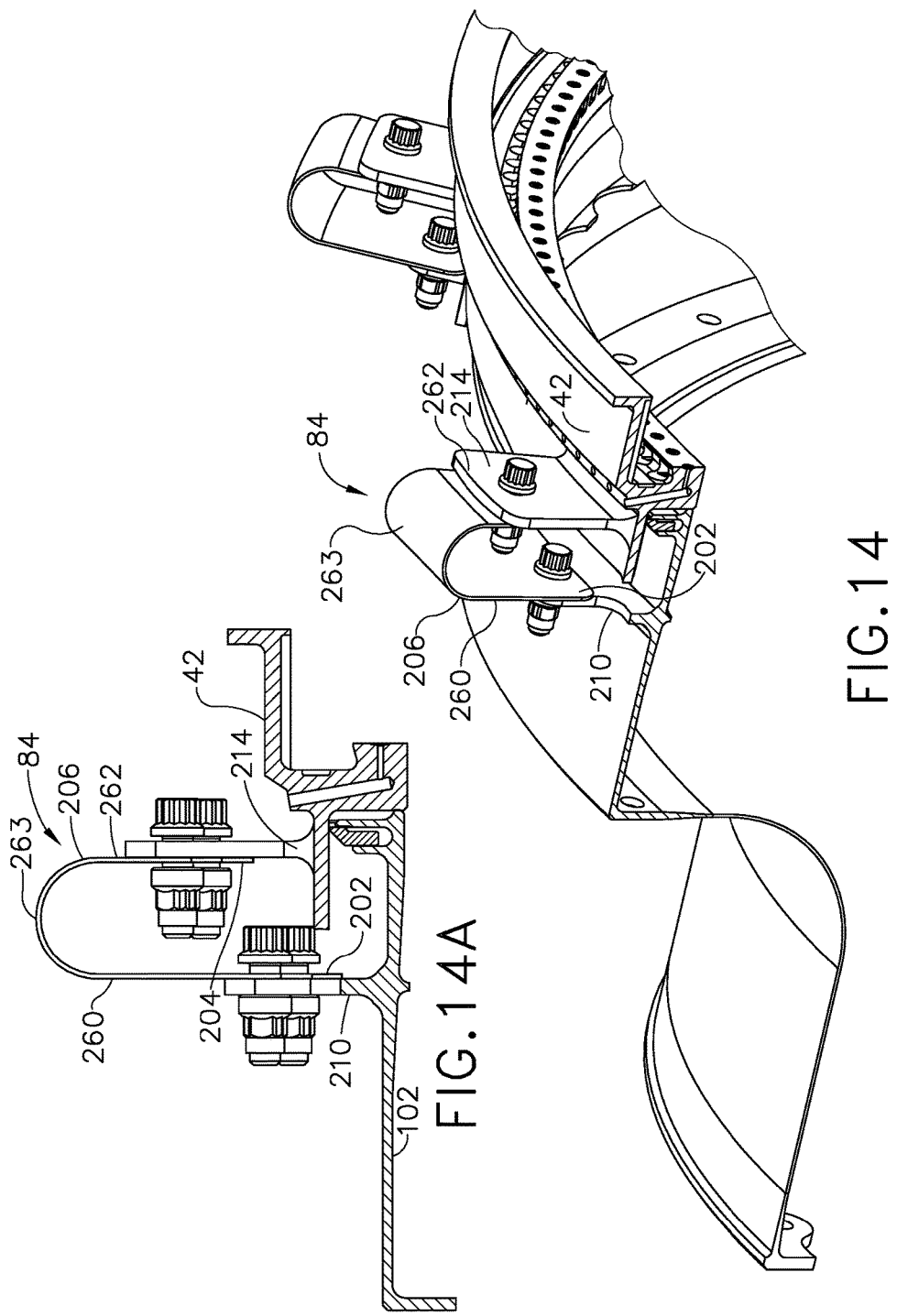

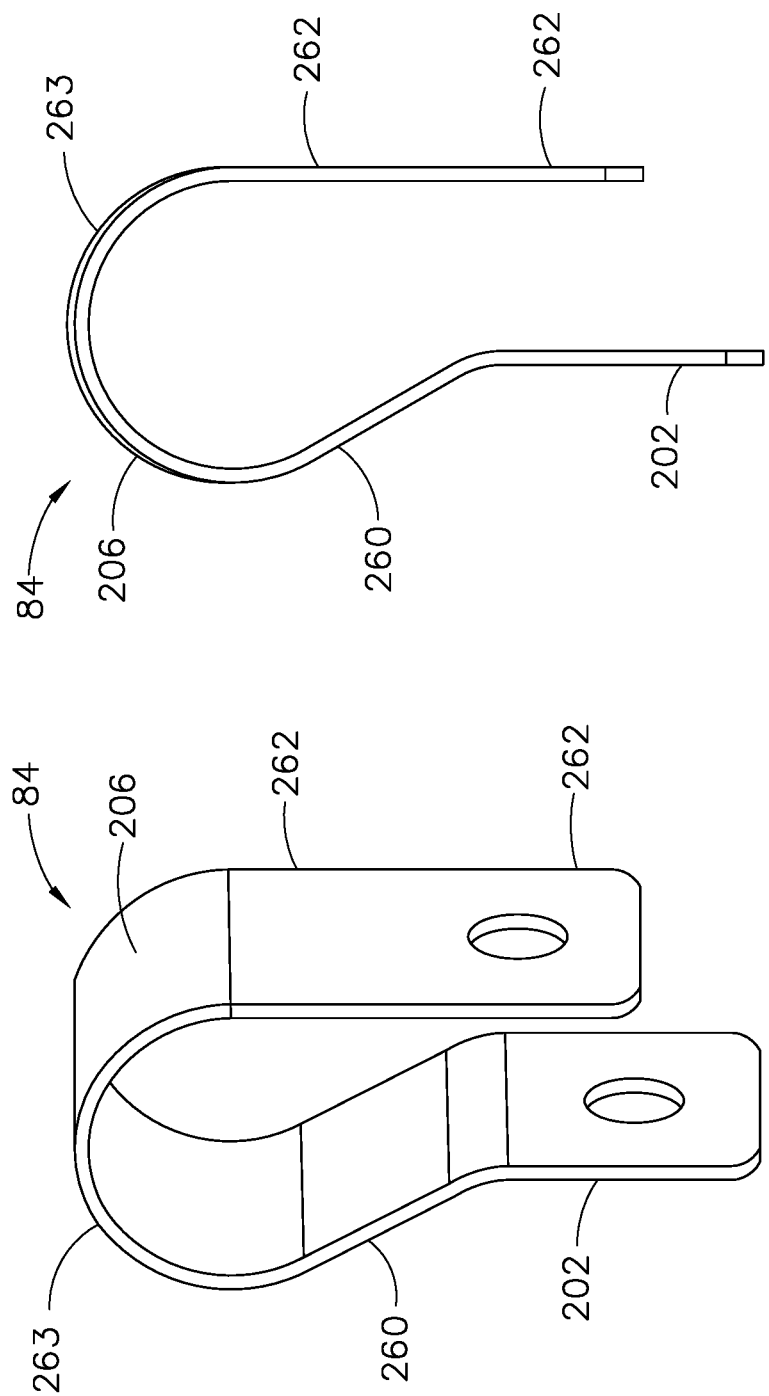

ASPIRATING FACE SEAL WITH NON-COILED RETRACTION SPRINGS

BACKGROUND OF THE INVENTION

The present invention relates generally to aspirating face seals between rotor and stator assemblies and, more particularly, to an aspirating face seal having retraction springs.

Aspirating face seals minimize leakage of a fluid, such as compressed air or combustion gases, by restricting flow between an area of high pressure and an area of low pressure. Aspirating face seals control leakage by compensating for variations in the gap which may exist between a rotor and stator. Such seals have been disclosed for use in rotating machinery, including, but not limited to, gas turbine engines used for power generation and for aircraft and marine propulsion.

Fluid leakage through gas turbine engine seal assemblies may significantly increase fuel consumption and adversely affect engine efficiency. Additionally, fluid leakage may cause damage to other components and/or increase overall engine maintenance costs. Because of the location of the seal assemblies and/or the operating environment, at least some known seal assemblies may deteriorate over time.

Some embodiments of aspirating face seals have the rotor configured as oppositely facing rotatable first and non-rotatable second seal elements. The rotatable first seal element is attached to, or is a monolithic portion of, the rotor. Likewise, such seals typically have the stator supporting the non-rotatable second seal element which is attached to, or a monolithic portion of, a slider. Retraction springs, typically coil springs, are used to separate or retract the rotating first and the non-rotating second seal elements during low or no power conditions. The non-rotating second seal element is mounted on the slider supported by the stator. Examples of such aspirating face seals are disclosed in patent applications from General Electric Company in Docket Numbers 279249 and 280429, filed in INDIA, assigned to the present Assignee the General Electric Company, and incorporated by reference. Docket Number 279249 is entitled "ANTI-CONING ASPIRATING FACE SEAL" and was filed in India on Apr. 14, 2016 with a Serial Number 2016/41013072. Docket Number 280429 is entitled "ASPIRATING FACE SEAL TOOTH CONFIGURATION" and was filed in India on May 11, 2016 with a Serial Number 2016/41016504.

U.S. Pat. No. 6,676,369 to Brauer, et al., issued Jan. 13, 2004, and entitled "Aspirating Face Seal with Axially Extending Seal Teeth", discloses a gas turbine engine aspirating face seal including a rotatable engine member and a non-rotatable engine member and a leakage path therebetween. Annular generally planar rotatable and non-rotatable gas bearing face surfaces circumscribed about a centerline are operably associated to the rotatable and non-rotatable engine members respectively. Radially inner and outer tooth rings axially extend away from a first one of the rotatable and non-rotatable gas bearing face surfaces across the leakage path and towards a second one of the gas bearing face surfaces. An auxiliary seal includes an annular restrictor tooth extending radially across the leakage path from a second one of the rotatable and non-rotatable gas bearing face surfaces towards the first one of the rotatable and non-rotatable gas bearing face surfaces. Coiled springs are utilized to separate the gas bearing face surfaces.

Known seal designs have also included an aspirator tooth extending from the stator axially across, and radially inward of, the air dam with the aspirator tooth having a tip spaced apart from and proximate the rotor. It is also important to note that aspirating face seal technology uses phrases such as "air bearing", "air dam", and "air flow", wherein it is understood that the word "air" is used to describe the working fluid of the seal. The working fluid of an aspirating face seal can include, without limitation, compressed air, combustion gases, and/or steam. Note, that an aspirating face seal is a non-contacting seal in that the first and second parts of the seal are not intended to touch but may for short periods of time during which they experience what are known as rubs.

The slider has sliding interfaces to guide the non-rotating seal member mounted on the stator or support. These interfaces allow the non-rotating seal member to translate axially but prevents rigid body motion in the radial direction or rotation in the circumferential direction. These sliding interfaces also allow a small amount of tilt to accommodate misalignment between the rotating and non-rotating portions of the seal. These sliding interfaces are subject to wear. It is desirable to reduce or eliminate wear of the sliding interfaces.

BRIEF DESCRIPTION OF THE INVENTION

A turbomachine aspirating face seal assembly includes an aspirating face seal operable for restricting leakage of high pressure air from a relatively high pressure region of the engine to a relatively low pressure region of the engine between a non-rotatable member of the engine and a rotatable member of the engine. The rotatable and non-rotatable engine members include gas bearing rotatable and non-rotatable face surfaces respectively, the non-rotatable face surface is on an annular slider axially slidingly mounted on the non-rotatable engine member, and a retracting means for retracting the annular slider away from the rotatable member and the non-rotatable face surface away from the rotatable surface. The retracting means includes a plurality of circumferentially spaced non-coiled or at least partially flat springs and each of the springs is axially disposed between the slider and the non-rotatable engine member.

Each of the springs may be substantially flat or a leaf spring and include first and second ends and a middle portion therebetween, the first and second ends mounted or attached to first and second mounting lugs or tabs on or attached to the non-rotatable member and the slider, respectively. The first end may be mounted on a bracket mounted on or attached to the first mounting lug or tab.

The springs may be arranged or oriented for retracting the slider if the slider contacts or rubs the rotatable member. The springs may be leaf springs including first and second ends and a substantially flat and straight middle portion therebetween, the first and second ends may be mounted or attached to first and second mounting lugs or tabs on or attached to the non-rotatable member and the slider, respectively, and the springs may be clocked in a rotor direction of the rotatable member about a centerline axis of rotation of the rotatable member.

The leaf springs may have a constant height in the first and second ends and the middle portion.

Each of the leaf springs may include bolt holes in the first and second ends and a thickness in the first and second ends greater than the thickness in the middle portion. The seal assembly may further include thick to thin transition sections between the middle portion and the first and second ends.

The leaf springs may include the first and second ends being diamond shaped, the first and second ends having a greater height than the middle portion, and the first and second ends and the middle portion having a uniform thickness.

The leaf springs may include a slotted or lattice structure in the middle portion, including slots in the middle portion, and the middle portion may have a height greater than the first and second ends.

The leaf springs may include the middle portion being tapered and having a variable height, and the first and second ends and the middle portion having a uniform thickness.

Embodiments of the seal assembly may include each of the leaf springs having first and second ends and a middle portion therebetween, the first and second ends and the middle portion being integral and monolithic with a first mounting lug or tab and the non-rotatable member, and the first mounting lug or tab being on or attached to the non-rotatable member. The seal assembly may further include a locating tab extending aft from the second end and located radially outwardly of bolt holes in the second end.

Some embodiments of the middle portion may include an S-shaped free-state shape and an axially forwardly bowed section connected to an axially aftwardly bowed section and an inflection point therebetween.

The springs may be hairpin springs with the middle portion being a double leg U-shaped middle portion including a circumferentially extending forward first leg connected to the first end and a circumferentially extending aft second leg connected to the second end. A U-bend is disposed between and connecting the first and second legs. The first and second ends may include first and second flat portions connected to the first and second legs by first and second S-bends respectively.

The seal assembly may have a double leg U-shaped middle portion including axially spaced apart radially extending forward first and aft second legs, a U-bend disposed between and connecting the first and second legs, the first mounting lug or tab extending radially outwardly from and attached to the non-rotatable member, and the second mounting lug or tab extending radially outwardly from and attached to the slider. The first and second mounting lugs or tabs may be aligned.

The seal assembly may include a secondary seal in sealing engagement with an annular radially inner slider surface of the annular slider in the low pressure region and the retracting means located radially outwardly of the annular slider in the high pressure region.

The seal assembly may include annular labyrinth primary and starter seal teeth mounted on a seal teeth carrier on the rotatable member designed and operable to sealingly engage corresponding abradable primary and starter seal lands respectively on the non-rotatable member.

The seal assembly may include an annular labyrinth primary seal tooth mounted on the non-rotatable member and an annular labyrinth starter seal tooth mounted on a seal teeth carrier on the rotatable member.

BRIEF DESCRIPTION OF THE DRAWINGS

FIG. 13A is a diagrammatical view illustration of an arrangement of the hairpin springs illustrated in FIG. 13 all aligned in the same circumferential direction.

FIG. 13B is a diagrammatical view illustration of an arrangement of the hairpin springs illustrated in FIG. 13 in which circumferentially adjacent springs are aligned in opposite circumferential directions with U-bends of the circumferentially adjacent springs facing each other and in opposite circumferential directions.

FIG. 14 is a perspective illustration of the aspirating gas bearing face seal embodiment illustrated in FIG. 2 with a U-shaped retraction spring.

FIG. 14A is a cross sectional view illustration of the aspirating gas bearing face seal embodiment with the U-shaped retraction spring illustrated in FIG. 14.

FIG. 14B is a perspective view illustration of the U-shaped retraction spring illustrated in FIG. 14 with a forward leaning leg.

FIG. 14C is a cross sectional view illustration of the U-shaped retraction spring with the forward leaning leg illustrated in FIG. 14B.

DETAILED DESCRIPTION OF THE INVENTION

Figure 1:
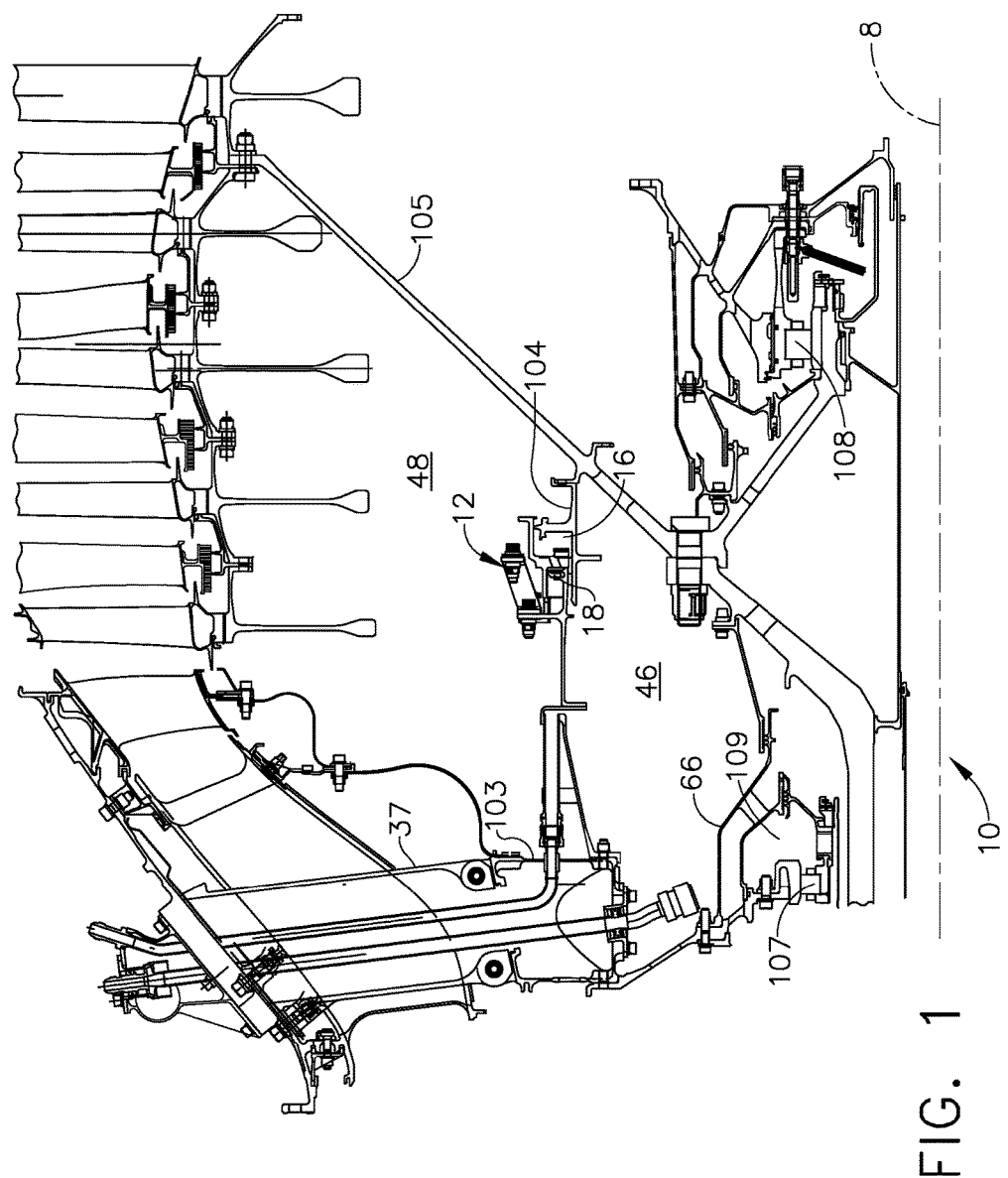
FIG. 1 is a cross-sectional view illustration of a portion of an exemplary gas turbine engine with a first exemplary embodiment of an aspirating face seal with non-coiled retraction springs.
Figure 2:
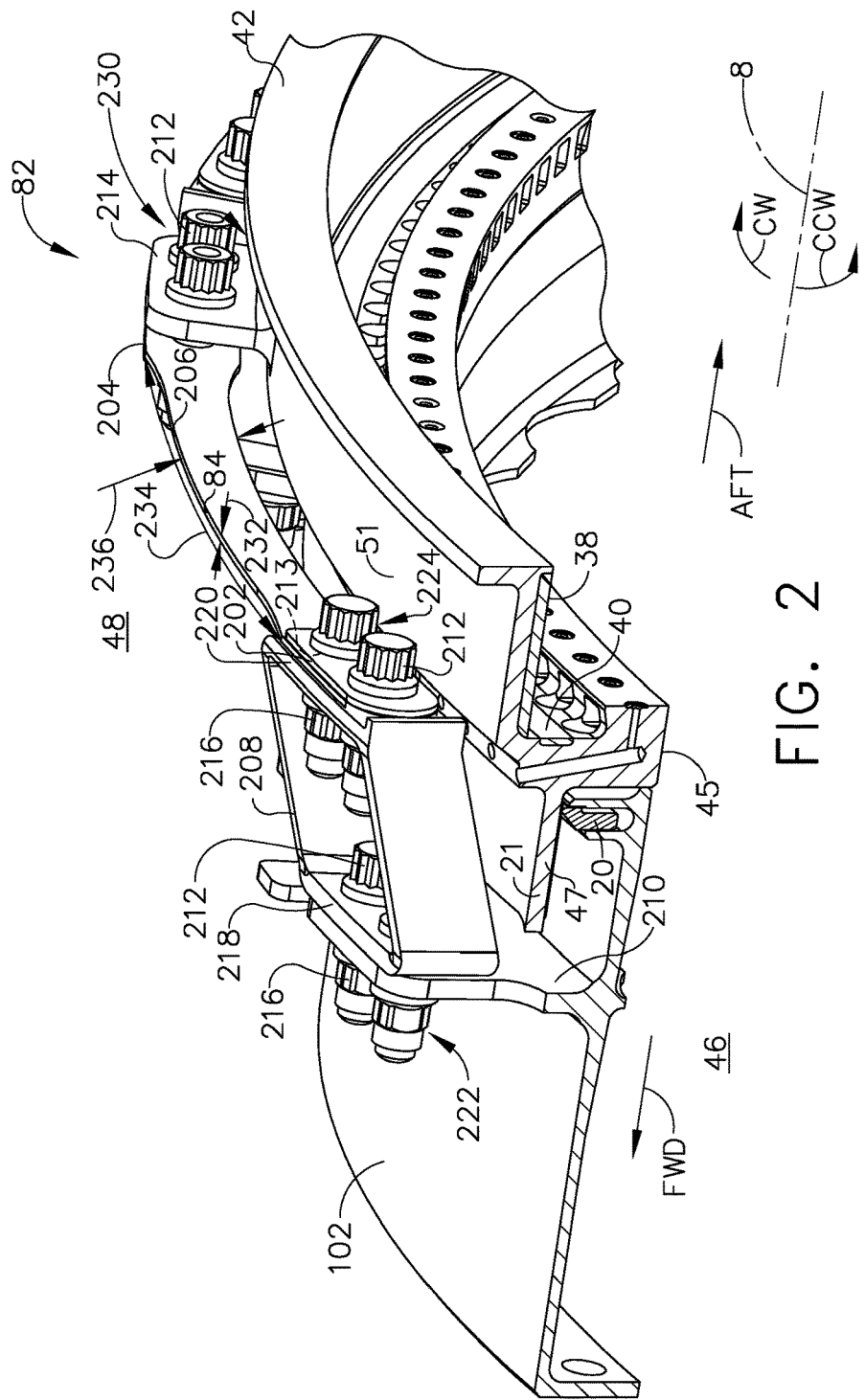
FIG. 2 is a cut-away perspective view illustration of a retraction leaf spring in the aspirating gas bearing face seal illustrated in FIG. 1.
Figure 3:
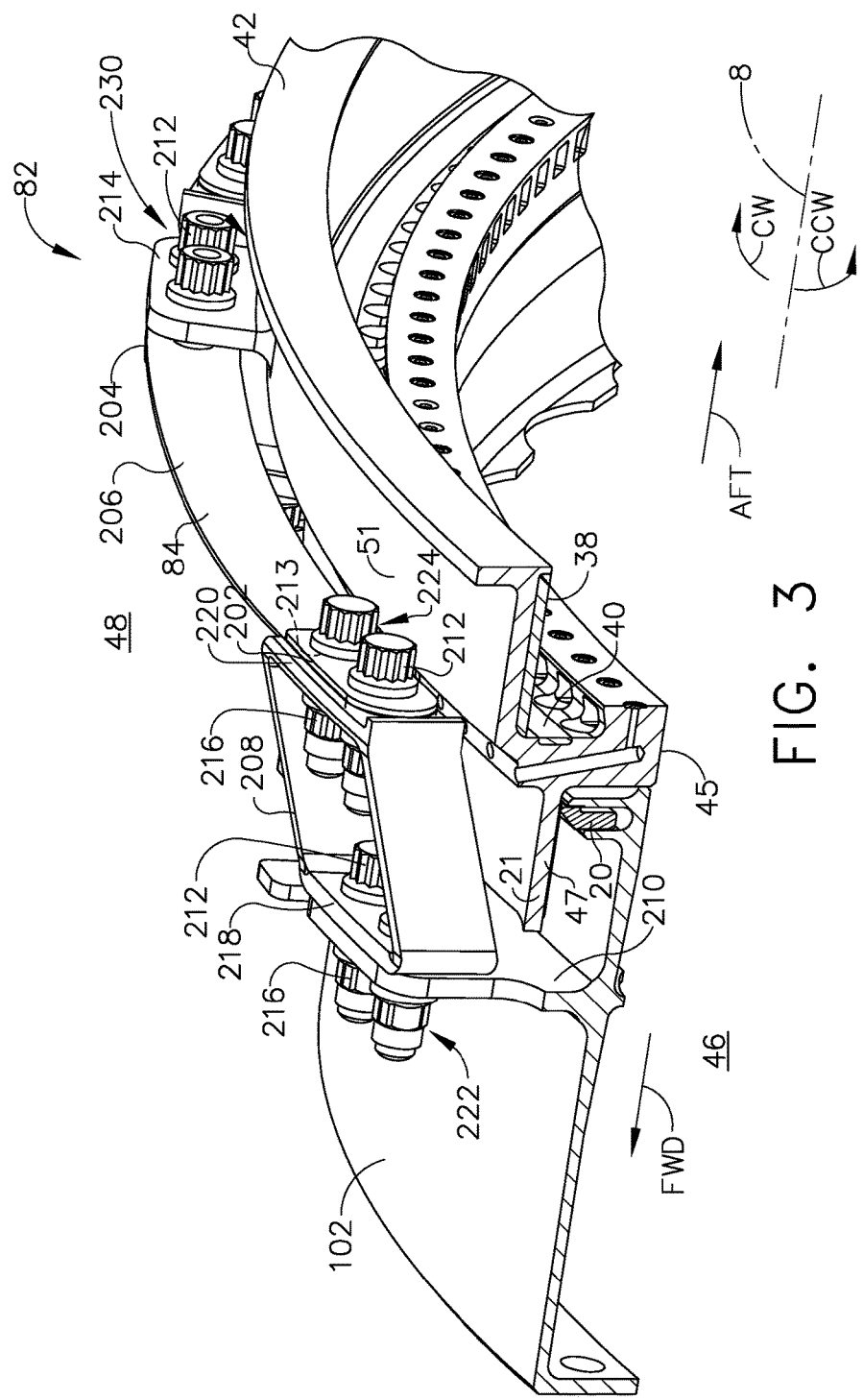
FIG. 3 is a cut-away perspective view illustration of the aspirating gas bearing face seal illustrated in FIG. 1 with a constant height retraction leaf spring.

Illustrated in FIGS. 1-3 is a first exemplary embodiment of an aspirating face seal assembly 12 having an annular aspirating face seal 16 and a secondary seal 18 which is illustrated herein as including a piston ring 20 as illustrated in FIG. 2. The seal assembly 12 is designed for controlling leakage or sealing between a high pressure region 48 and a low pressure region 46 such as may be found in a turbomachine such as a gas turbine engine 10 as illustrated in FIG. 1. Turbomachines include, but are not limited to, steam turbines, compressors, and turbocompressors such as may be used in the gas and oil industry, or similar apparatus.

Referring to FIG. 1, the exemplary embodiment of the turbomachine or gas turbine engine 10 is circumscribed about a centerline axis 8 of the engine 10 and includes an annular stationary stator or non-rotatable member 102 coupled to an annular frame 103 and a rotating or rotatable member 104 at least in part rotatably supported by an aft bearing 108. The frame 103 is illustrated herein as an annular turbine center frame 37 circumscribed about the centerline axis 8 of the engine 10. Additionally, non-rotatable member 102 is a stationary annular member circumscribed about the centerline axis 8 of the gas turbine engine 10. In the embodiments illustrated herein, non-rotatable member 102 is bolted to the frame 103 and the rotatable member 104 is rotatably coupled within the engine 10 to rotate about the centerline axis 8. The high pressure region 48 is located radially outwardly of the low pressure region 46 and the non-rotatable member 102 is located radially between the high and low pressure regions 48, 46. The frame 103 supports a middle bearing 107 in an annular sump 109 bounded by a generally conical sump member 66 located radially inwardly of the non-rotatable member 102.

Figure 4:
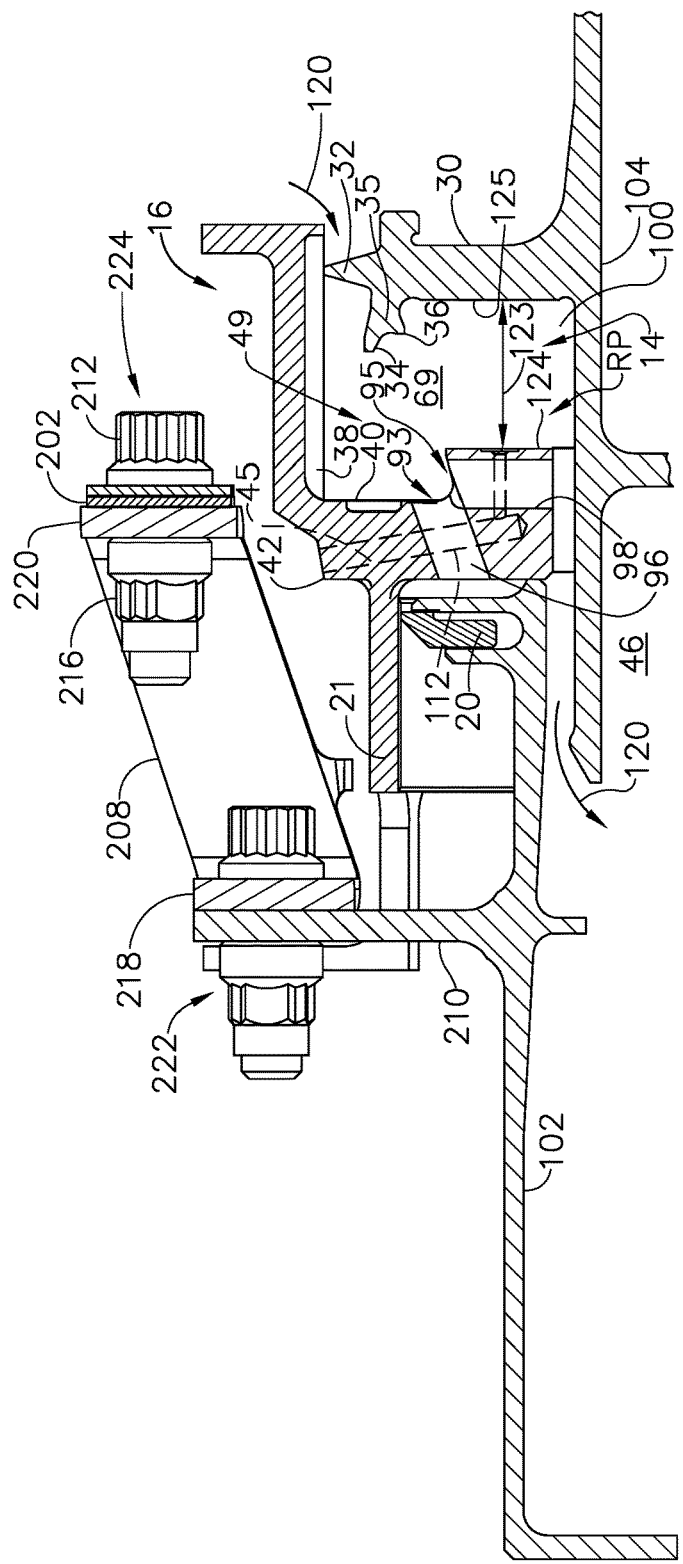
FIG. 4 is a cross-sectional view illustration of a first circumferential end of the leaf spring bolted to a stator portion of the aspirating gas bearing face seal illustrated in FIG. 2.
Figure 5:
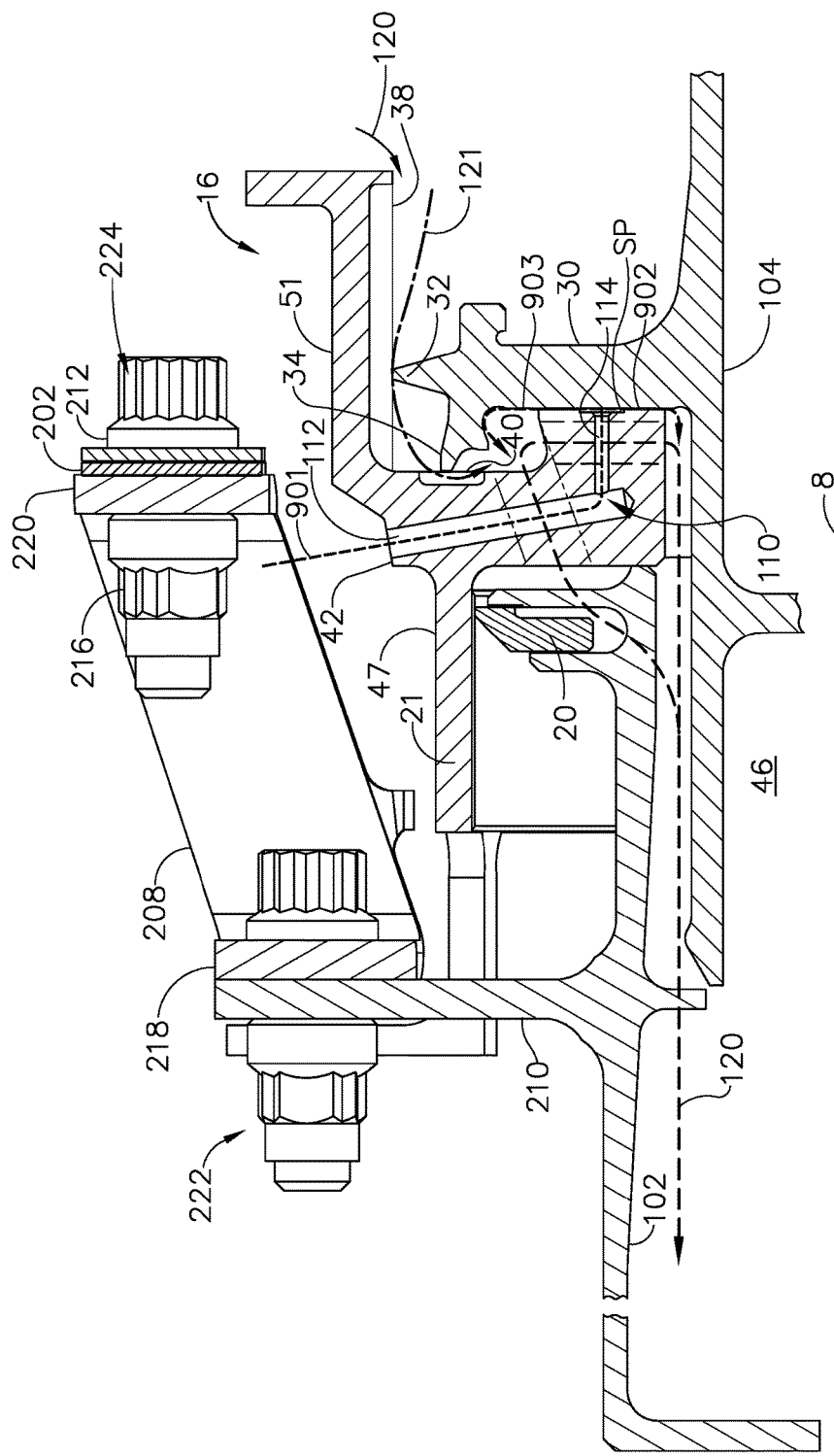
FIG. 5 is a cross-sectional view illustration of the aspirating gas bearing face seal illustrated in FIG. 4 in a sealing position.

Referring to FIGS. 1, 4, and 5, the aspirating face seal 16 is used to restrict leakage of high pressure air 120 from the relatively high pressure region 48 to a relatively low pressure region 46 between the non-rotatable member 102 and the rotatable member 104. The leakage of high pressure air 120 passes through the aspirating face seal 16 between the rotatable and non-rotatable members 104, 102 and between gas bearing rotatable and non-rotatable face surfaces 125, 124 respectively. The rotatable and non-rotatable face surfaces 125, 124 are circumscribed around and generally perpendicular to the engine centerline axis 8. Non-contact sealing during engine operation is obtained via an air bearing film formed between the rotatable and non-rotatable face surfaces 125, 124 which function as a slider bearing face and a rotor bearing face respectively.

The embodiment of the aspirating face seal 16 illustrated in FIGS. 4 and 5 includes a rotatable seal teeth carrier 30 in the form of a flange on the rotatable member 104. The rotatable face surface 125 is on the carrier 30. Primary, starter, and deflector seal teeth 34, 32, 36 are mounted radially outwardly of the rotatable face surface 125 on the seal teeth carrier 30. The primary and starter seal teeth 34, 32 are annular labyrinth seal teeth designed and operable to sealingly engage corresponding abradable primary and starter seal lands 40, 38 located and mounted on an annular slider 42 axially slidingly mounted on the annular non-rotatable member 102 illustrated in FIGS. 2 and 3. The annular slider 42 includes a central ring 45 and annular forward and aft extensions 47, 51 extending forwardly and aftwardly respectively from the central ring 45.

The starter seal land 38 faces radially inwardly from and is carried on the annular aft extension 51. The primary seal land 40 faces axially aftwardly from and is carried on the central ring 45 of the annular slider 42. The starter seal land 38 is recessed forwardly of the non-rotatable face surface 124 on the central ring 45. The non-rotatable face surface 124 is mounted on the central ring 45.

The primary seal tooth 34 extends axially forward and slightly radially outwardly from a forward carrier extension 35 of the seal teeth carrier 30. The deflector seal tooth 36 extends axially forward and slightly radially inwardly from the forward carrier extension 35 of the seal teeth carrier 30. The forward carrier extension 35 extends forwardly from the seal teeth carrier 30 and supports the primary and the deflector seal teeth 34, 36. The starter seal tooth 32 extends substantially radially from the seal teeth carrier 30 and substantially normal to the centerline axis 8 of the engine 10. The primary and starter seal lands 40, 38 may be made of or include an abradable material. The abradable material may be a honeycomb material, thermal spray abradable material such as nickel graphite, or other abradable material.

The non-rotatable face surface 124 is located radially inwardly of the primary and starter seal lands 40, 38 on the annular slider 42 and is substantially parallel to the rotatable face surface 125 on the rotatable member 104. The non-rotatable and rotatable face surfaces 124, 125 are axially spaced apart a variable distance 123. Under a pressure differential between the high and low pressure regions 48, 46, the slider 42 moves axially aft, closing the non-rotatable and rotatable face surfaces 124, 125. A variable axial length annular plenum 69 extends axially between the slider 42 and the rotatable face surface 125. A gas bearing space 100 extends axially between the non-rotatable and rotatable face surfaces 124, 125.

Referring to FIGS. 3-5, air feed passages 110 extend through the central ring 45 of the annular slider 42 and from the high pressure region 48 to the gas bearing space 100 between the non-rotatable and rotatable face surfaces 124, 125. The exemplary embodiment of the air feed passages 110 illustrated herein includes feed holes 112 extending generally radially inwardly from the high pressure region 48 through the central ring 45 to corresponding axially extending orifice bores 114 in the central ring 45. The orifice bores 114 extend axially through the central ring 45 from the feed holes 112 through the non-rotatable face surface 124 to the gas bearing space 100.

First and second pluralities 93, 95 of circumferentially spaced apart first and second vent passages 96, 98 through the central ring 45 of the annular slider 42 provide pressure communication between the plenum 69 and low pressure region 46 as illustrated in FIG. 4. The first and second vent passages 96, 98 vent the plenum 69 to the low pressure region 46 during engine operation when there is a substantial pressure differential between high and low pressure regions 48, 46. The first vent passages 96 are inclined radially inwardly and extend from the plenum 69 forward and radially inwardly. The second vent passages 98 extend substantially radially inwardly from the plenum 69 through the central ring 45 of the annular slider 42.

The starter seal tooth 32 is used to initiate closure of the aspirating face seal 16. The starter seal tooth 32 is located on the seal teeth carrier 30 mounted on the rotatable member 104 and extends radially towards the non-rotatable abradable starter seal land 38. This design allows the starter tooth to rub into an abradable during high radial excursions rather than have metal to metal contact. The deflector seal tooth 36 is used to help reduce build-up of interior pressures in the gas bearing space 100 and the annular plenum 69 between the stationary and rotating seal surfaces.

Figure 15:
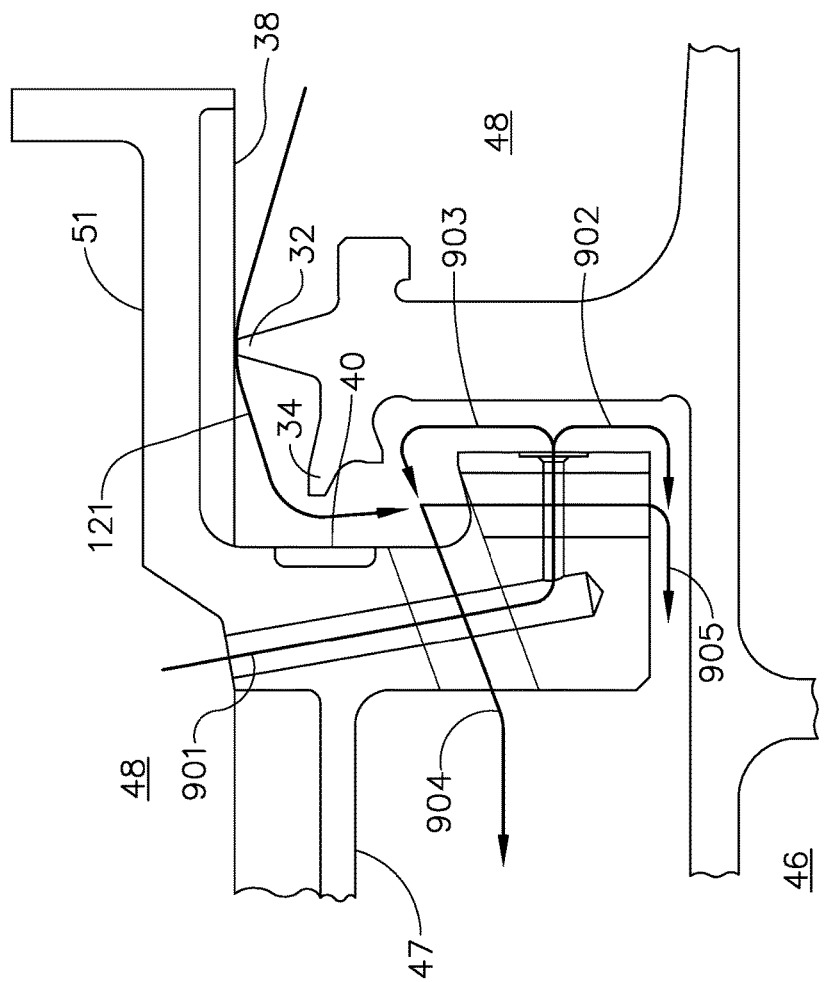
FIG. 15 is a diagrammatical cross-sectional view illustration of flows through the aspirating gas bearing face seal illustrated in FIG. 2 in a partially open position.

FIG. 15 illustrates various air flows through the aspirating face seal 16 during engine operation when the aspirating face seal 16 is partially open. Gaps between the primary and starter seal teeth 34, 32 and the primary and starter seal lands 40, 38 respectively allow room to draw flows between the teeth and lands. Bearing flow 901 comes from the high pressure region 48 through the air feed passages 110 into the gas bearing space 100 between the non-rotatable and rotatable face surfaces 124, 125. The bearing flow 901 exits the gas bearing space 100 as radially outward bearing flow 903 and radially inward bearing flow 902. The radially outward bearing flow 903 passes through the first and second vent passages 96, 98 and together with the radially inward bearing flow 902 passes through a gap between the rotatable member 104 and the non-rotatable member 102 to reach the low pressure region 46.

Seal flow 121 leaks or flows between the starter seal tooth 32 and the starter seal land 38 and then between the primary seal tooth 34 and the primary seal land 40. During engine operating conditions with the aspirating face seal 16 closed, the primary seal tooth 34 is the main restriction to air flow through the aspirating face seal 16. The seal flow 121 merges with the bearing flow 901 in the annular plenum 69, and the merged flows exit the aspirating face seal 16 as axial and radially inward vent flows 904, 905 passing through the first and second vent passages 96, 98 respectively. The merged flows then pass through the gap between the rotatable member 104 and the non-rotatable member 102 to reach the low pressure region 46.

The primary seal flow 121 across the primary seal tooth 34 and radially outward bearing flow 903 enter the plenum 69 as jets due to a pressure drop across the aspirating face seal 16 from the high pressure region 48 to the low pressure region 46. The primary seal flow 121 exits the gap between the primary seal tooth 34 and the primary seal land 40 traveling substantially radially inward towards the first and second vent passages 96, 98. The radially outward bearing flow 903 enters the plenum 69 traveling radially outwardly and is redirected by deflector seal tooth 36 towards the first and second vent passages 96, 98. The radially outward bearing flow 903 and the primary seal flow 121 merge into the axial and radially inward vent flows 904, 905 which flow out from plenum 69 through the first and second vent passages 96, 98 respectively to the low pressure region 46.

The redirection of radially outward bearing flow 903 by the deflector tooth 36 increases flow into the first and second vent passages 96, 98 causing a higher discharge coefficient (Cd) and greater effective passage area. This causes the air pressure in plenum 69 to approach that of the low pressure region 46. Similarity in pressure between plenum 69 and the low pressure region creates a more stable force balance acting on slider 42 which results in a more determinate operating clearance between air bearing surfaces. Cd is a standard engineering ratio used to find the effective area of a hole or passage that a fluid is passing through, i.e actual area*Cd=effective area. A perfect Cd=1, but Cd for real holes are lower.

Figure 17:
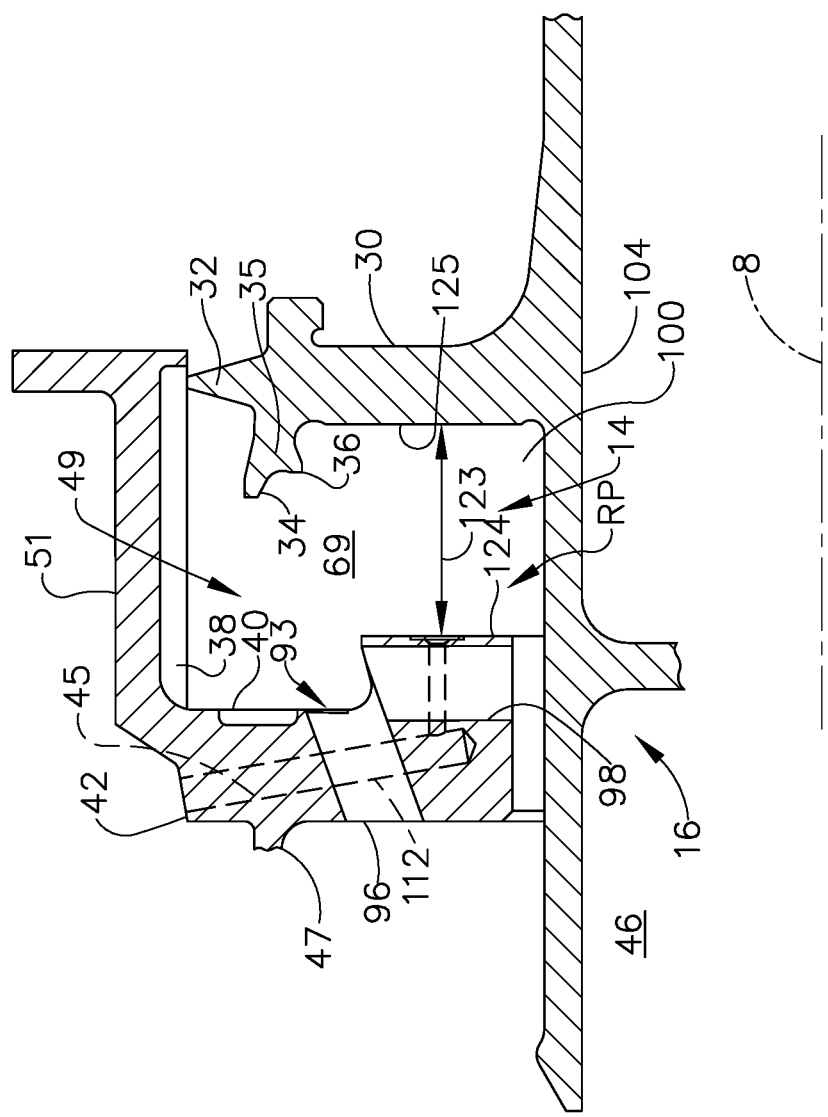
FIG. 17 is a cross-sectional view illustration of the aspirating gas bearing face seal illustrated in FIG. 4 in an open position and the slider in a retracted position.

During higher power operation, the primary seal tooth 34 restricts the air 120 flowing from the relatively high pressure region 48 to the relatively low pressure region 46, thereby, causing an increase in the pressure differential between high and low pressure regions 48, 46. A high pressure differential between high and low pressure regions 48, 46 acts on areas of the slider 42 upstream of the starter seal tooth 32 resulting in a net axial force that pushes slider 42 and the primary and starter seal lands 40, 38 located on the slider 42 toward the rotatable face surface 125 on the rotatable member 104 and the primary, starter, and deflector seal teeth 34, 32, 36. The aspirating face seal 16 is illustrated in an open position in FIG. 17 and in an almost closed position in FIG. 4.

Illustrated in FIGS. 1-4 is a retracting means 82 for retracting the annular slider 42 away from the rotatable member 104 and the non-rotatable face surface 124 away from the rotatable surface 125 during low or no power conditions. During low or no power conditions, the slider 42 and the non-rotatable face surface 124 are biased away from the rotatable face surface 125 or the rotating seal surface on the rotatable member 104 by the retracting means 82. This causes the gas bearing space 100 and the annular plenum 69 to axially lengthen and the primary seal tooth 34 to retract from the primary seal land 40 on the slider 42.

Figure 6:
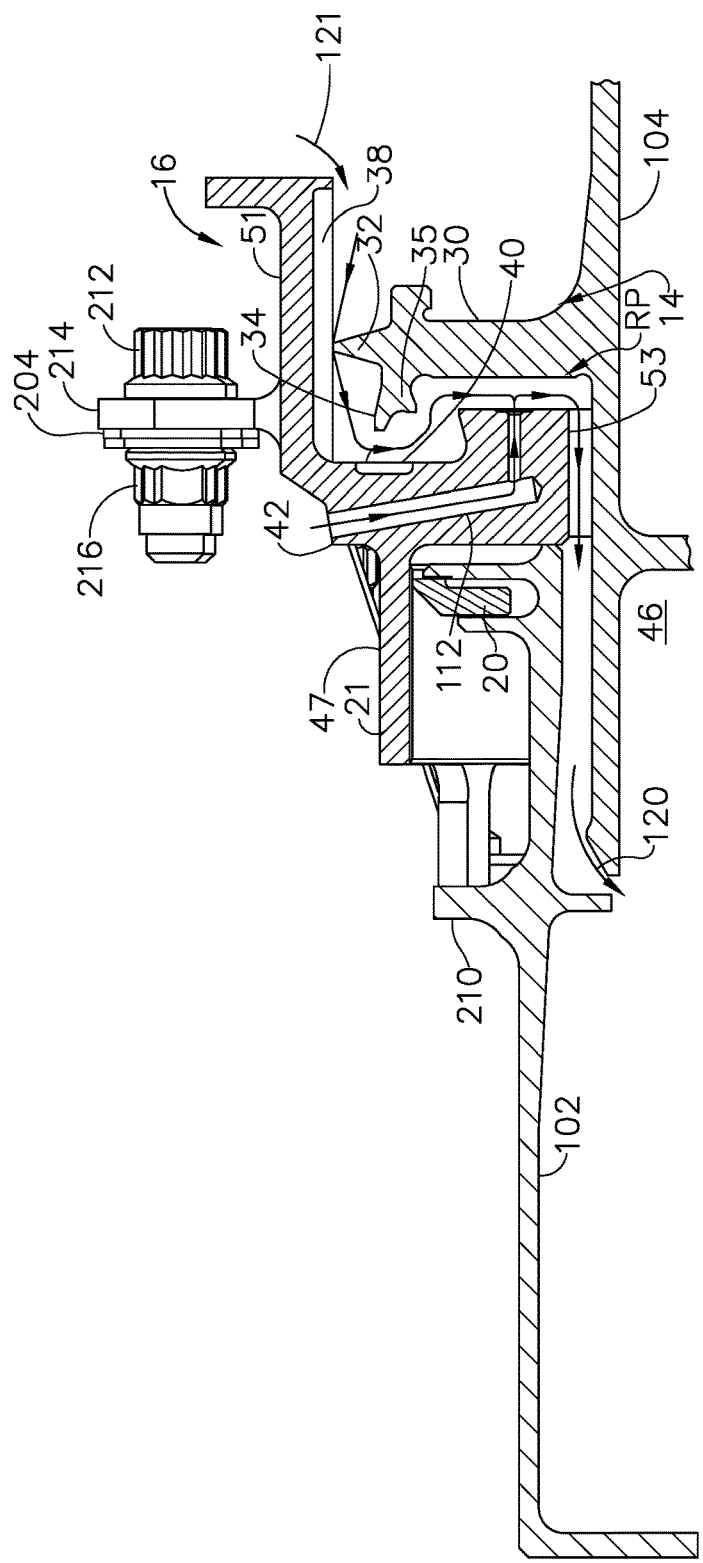
FIG. 6 is a cross-sectional view illustration of a second circumferential end of the retraction leaf spring bolted to a slider of the aspirating gas bearing face seal illustrated in FIG. 2.

Referring to FIGS. 2-12, the retracting means 82 includes a plurality of circumferentially spaced apart non-coiled leaf springs 84 disposed between and around the non-rotatable member 102 and the slider 42. Each of the springs 84 includes first and second ends 202, 204 and a middle portion 206 therebetween. The first end 202 is mounted by a bracket 208 mounted on or attached to a first mounting lug or tab 210 on or attached to the non-rotatable member 102 as illustrated in FIG. 5. The second end 204 is mounted on or attached to a second mounting lug or tab 214 on or attached to the slider 42 downstream or aft of the first mounting tab 210 as illustrated in FIG. 6.

Bolts 212 and nuts 216 may be used to secure or attach the first and second ends 202, 204. The first and second mounting tab 210, 214 may be integral and monolithic with the non-rotatable member 102 and the slider 42 respectively. The bracket 208 includes axially spaced forward and aft bars 218, 220. A forward set 222 of the bolts 212 and nuts 216 attach or connect the forward bar 218 and the bracket 208 to the first mounting tab 210 on the non-rotatable member 102. An aft set 224 of the bolts 212 and nuts 216 attach or connect the first end 202 of the spring 84 to the aft bar 220. A third set 230 of the bolts 212 and nuts 216 attach or connect the second end 204 of the spring 84 to the second mounting tab 214 on the slider 42. The bolts 212 are disposed through bolt holes 213 in the ends of the spring 84, illustrated in FIGS. 7-10.

The springs 84 are oriented to be compliant in the axial direction while being stiff in the radial and circumferential directions. The slider's freedom of motion is equivalent to the current art, but it does not require a sliding interface, which reduces wear. The retracting means 82 with the non-coil springs 84 reduces part count, eliminates coatings on wear surfaces, reduces machining operations, and lowers manufacturing and repair costs. The retracting means 82 with the leaf springs 84 eliminates features that require tight tolerances and, thus, result in reduced manufacturing and repair costs. The retracting means 82 with the non-coil springs 84 simplifies the assembly process because less shimming is required.

The retracting means 82 and the non-coil springs 84 are upstream, with respect to the bearing airflow in the gas bearing space 100, of the annular slider 42 and aspirating face seal 16 in the high pressure region 48. The retracting means 82 and the springs 84 are positioned upstream from the secondary seal 18 with respect to bearing airflow through the aspirating face seal 16. The retracting means 82 including the non-coil springs 84 are positioned radially outwardly of the forward extension 47, and the secondary seal 18 is positioned radially inwardly of the forward extension 47. The secondary seal 18 is in sealing engagement with an annular radially inner slider surface 21 of the annular slider 42 and is located on a border between the high and low pressure regions 48, 46. The retracting means 82 and the non-coil springs 84 are located radially outwardly of the annular slider 42, and the secondary seal 18 is located radially inwardly of the annular slider 42. The arrangement of the retracting means 82 and the secondary seal 18 reduces deflection of the non-rotatable face surface 124 on the annular slider 42.

Figure 16:
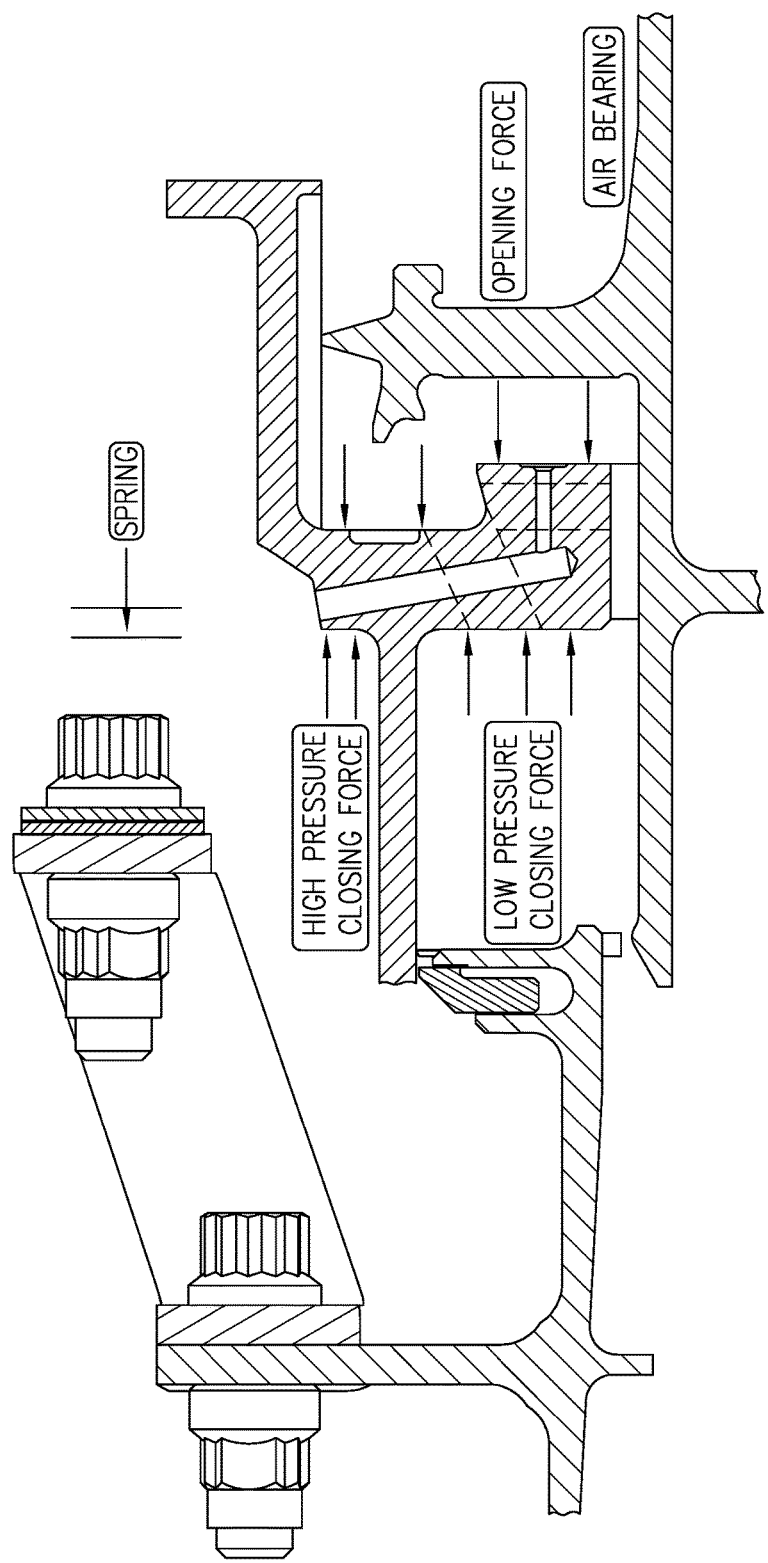
FIG. 16 is a diagrammatical illustration of forces acting on the aspirating gas bearing face seal illustrated in FIG. 2.

The central ring 45 of the annular slider 42 is designed to translate between axial retracted and sealing positions RP, SP as illustrated in FIGS. 4 and 5, respectively, as measured at the gas bearing non-rotatable face surface 124 as a result of forces, illustrated in FIG. 16, acting on the central ring 45. The forces are the result of pressures in the relatively low and high pressure regions 46, 48 acting on surfaces and spring forces of the retracting means 82.

Referring to FIG. 4, as the engine is started, the pressure in the high pressure region 48 begins to rise because the starter seal tooth 32 restricts the air 120 flowing from the relatively high pressure region 48 to the relatively low pressure region 46. The pressure differential between the low and high pressure regions 46, 48 results in a closing pressure force acting on central ring 45. The pressure force acts against a spring force from the retracting means 82 to push the central ring 45 and non-rotatable face surface 124 mounted thereupon towards the gas bearing rotatable face surface 125. FIG. 16 illustrates high and low pressure closing forces acting on the aspirating face seal 16 during engine startup and how the closing forces overcomes the spring force. Referring to FIG. 5, during shutdown of the engine, pressure in the high pressure region 48 drops off and the springs 84 of the retracting means 82 overcome the closing force and retract the aspirating face seal 16. Opening forces from high pressure air in the air bearing between the rotatable and non-rotatable face surfaces 125, 124 are also illustrated in FIG. 16.

Many styles and configurations of the leaf springs 84 may be used. Exemplary embodiments of the leaf spring 84, as illustrated in FIGS. 2 and 3, include a thickness 232 as measured axially, a length 234 as measured circumferentially of the middle portion 206, and a height 236 as measured radially. The middle portion 206 may be curved, arced, or circumscribed about the centerline axis 8. The height 236 of the middle portion 206 may vary or be different than the height 236 of the first and second ends 202, 204 as illustrated in FIG. 2. This allows the stress and stiffness of the leaf spring 84 to be controlled. The height 236 of the middle portion 206 may be the same as the height 236 of the first and second ends 202, 204 as illustrated in FIG. 3, thus, the height 236 in the first and second ends 202, 204 and middle portion 206 is constant. In both embodiments, the thickness is constant in the ends and the middle portion 206 therebetween.

Figure 7:
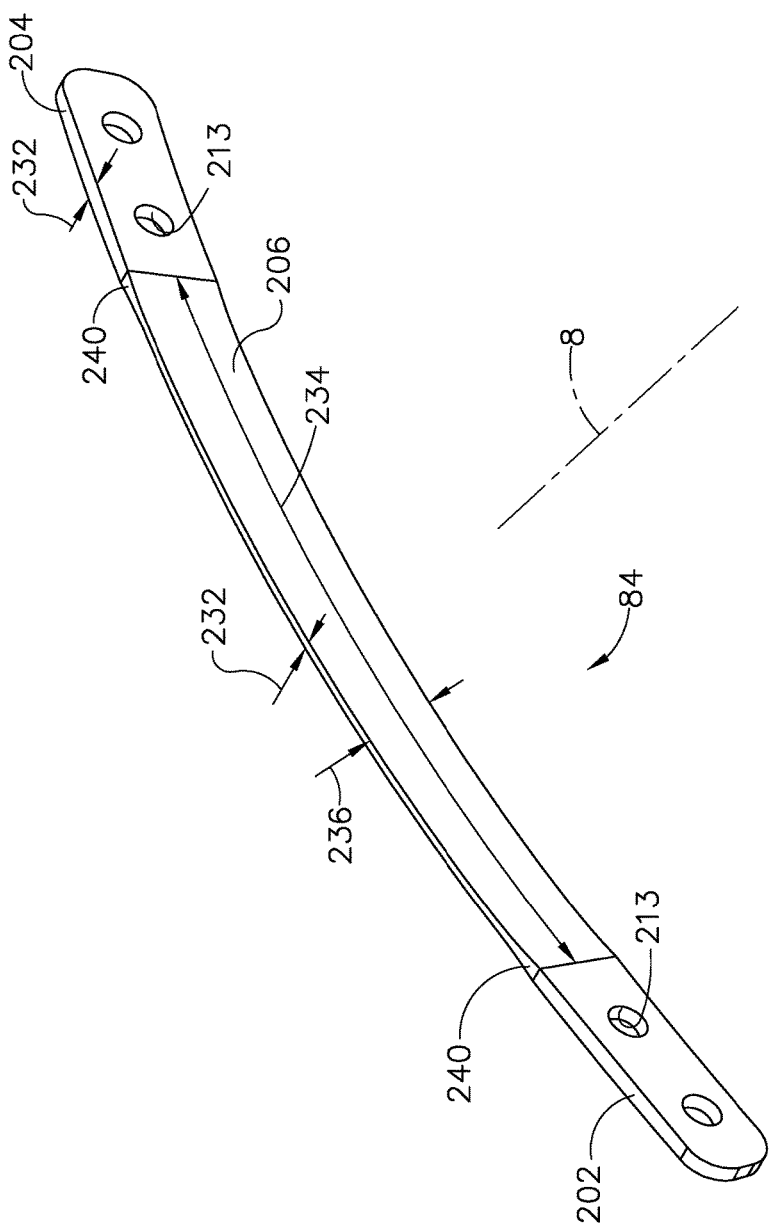
FIG. 7 is a perspective view illustration of an embodiment of a retraction leaf spring with circumferential ends thicker than a middle portion of the spring extending between the ends illustrated in FIG. 2.

The exemplary embodiment of the leaf spring 84 illustrated in FIG. 7 includes the thicknesses 232 being greater in the first and second ends 202, 204 than the middle portion 206. Leaf springs with thicker ends may be designed to drive bending away from the bolt holes 213 in the first and second ends 202, 204 and reduce bolt hole stresses. Thick to thin transition sections 240 between the middle portion 206 and the first and second ends 202, 204 of the flat spring 84 reduce bending stress and may be used to control spring stiffness. A tall, thin, middle portion 206 as illustrated in FIG. 7 provides radial stiffness and axial flexibility.

Figure 8:
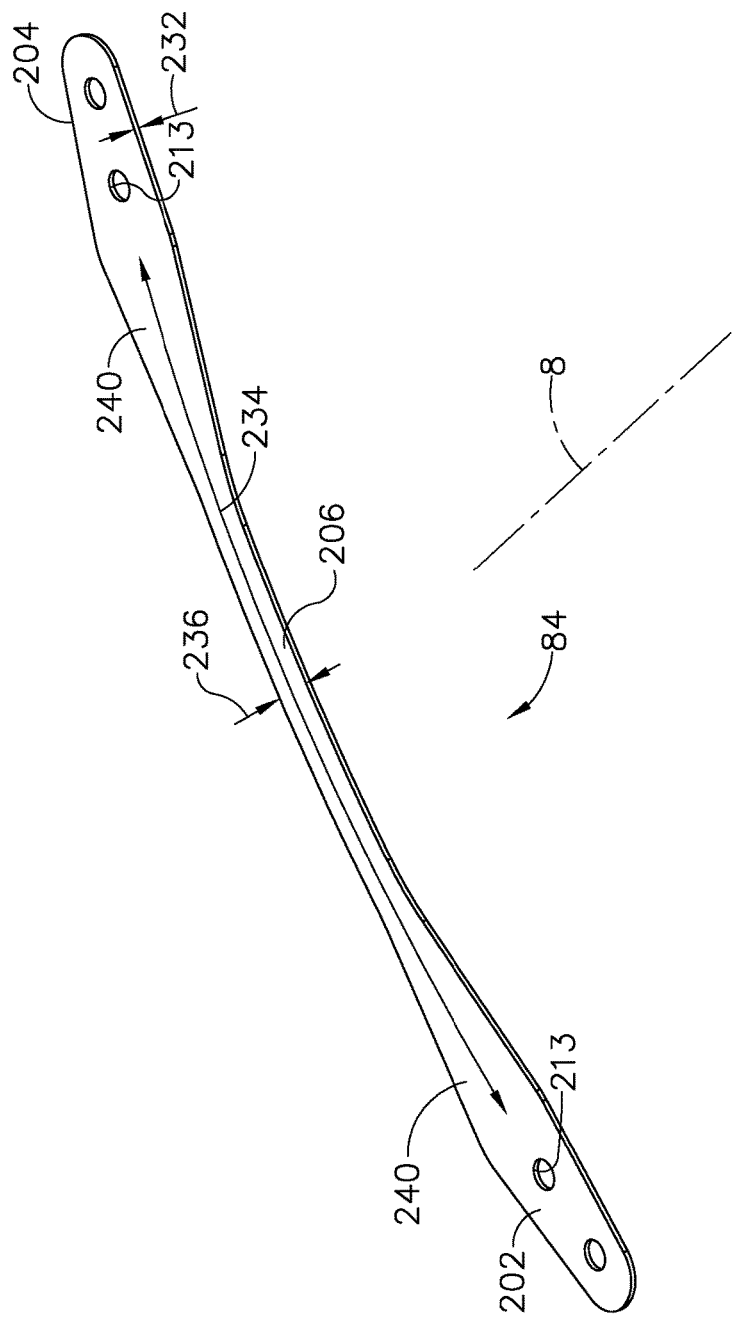
FIG. 8 is a perspective view illustration of an embodiment of the retraction leaf spring with diamond-shaped circumferential ends wider that the middle portion of the spring extending between the ends illustrated in FIG. 2.

Another exemplary embodiment of the leaf spring 84 illustrated in FIG. 8 includes diamond-shaped first and second ends 202, 204 which are relatively wide or high for spreading bending strain over a large area and reducing bolt hole 213 stress compared to smaller ends as illustrated in FIG. 7. This also enables the leaf spring 84 to have uniform thickness 232 which simplifies manufacture and reduces cost of the spring.

Figure 9:
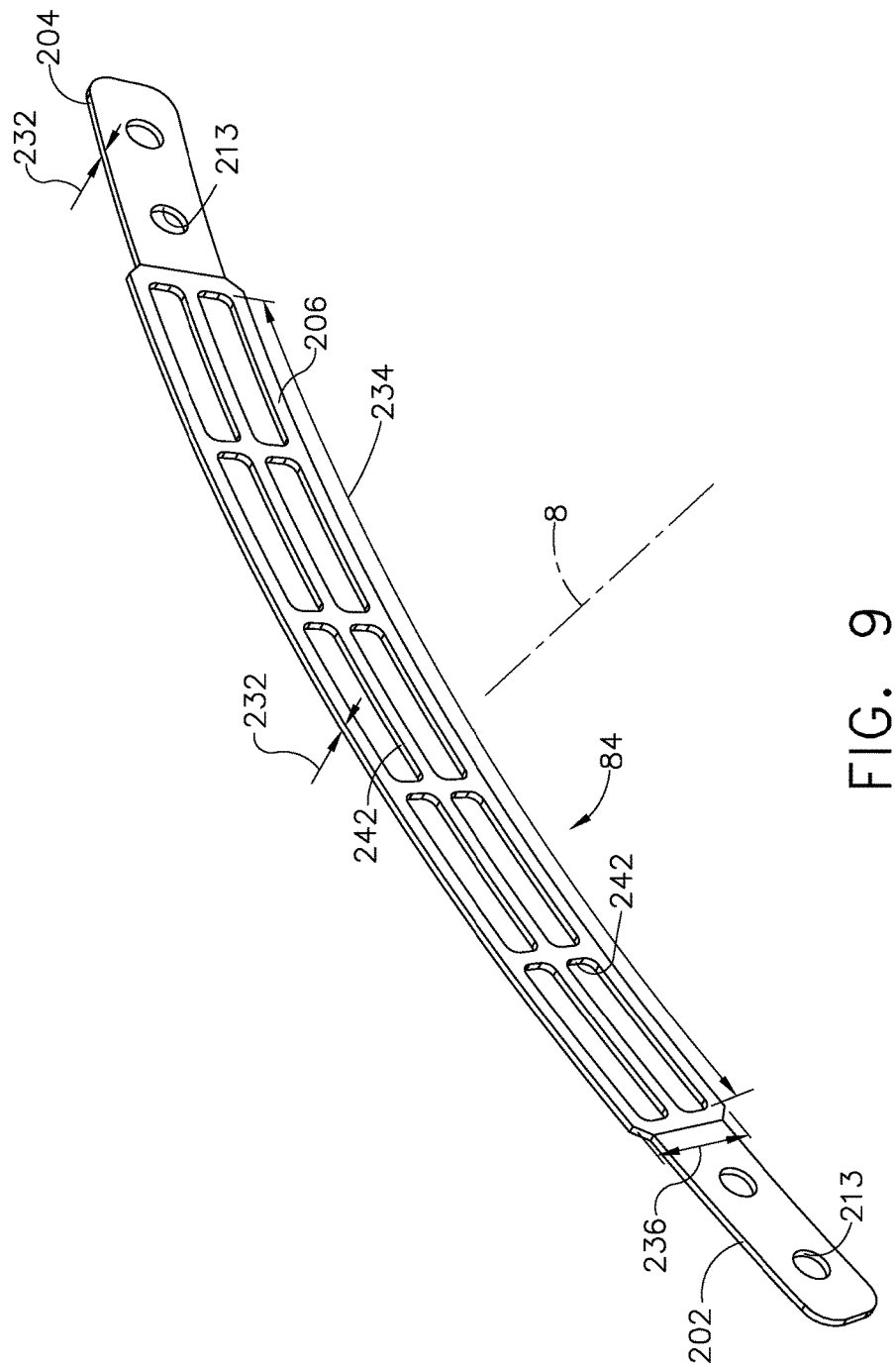
FIG. 9 is a perspective view illustration of an embodiment of the retraction leaf spring with a slotted configuration of the middle portion illustrated in FIG. 2.
Figure 10:
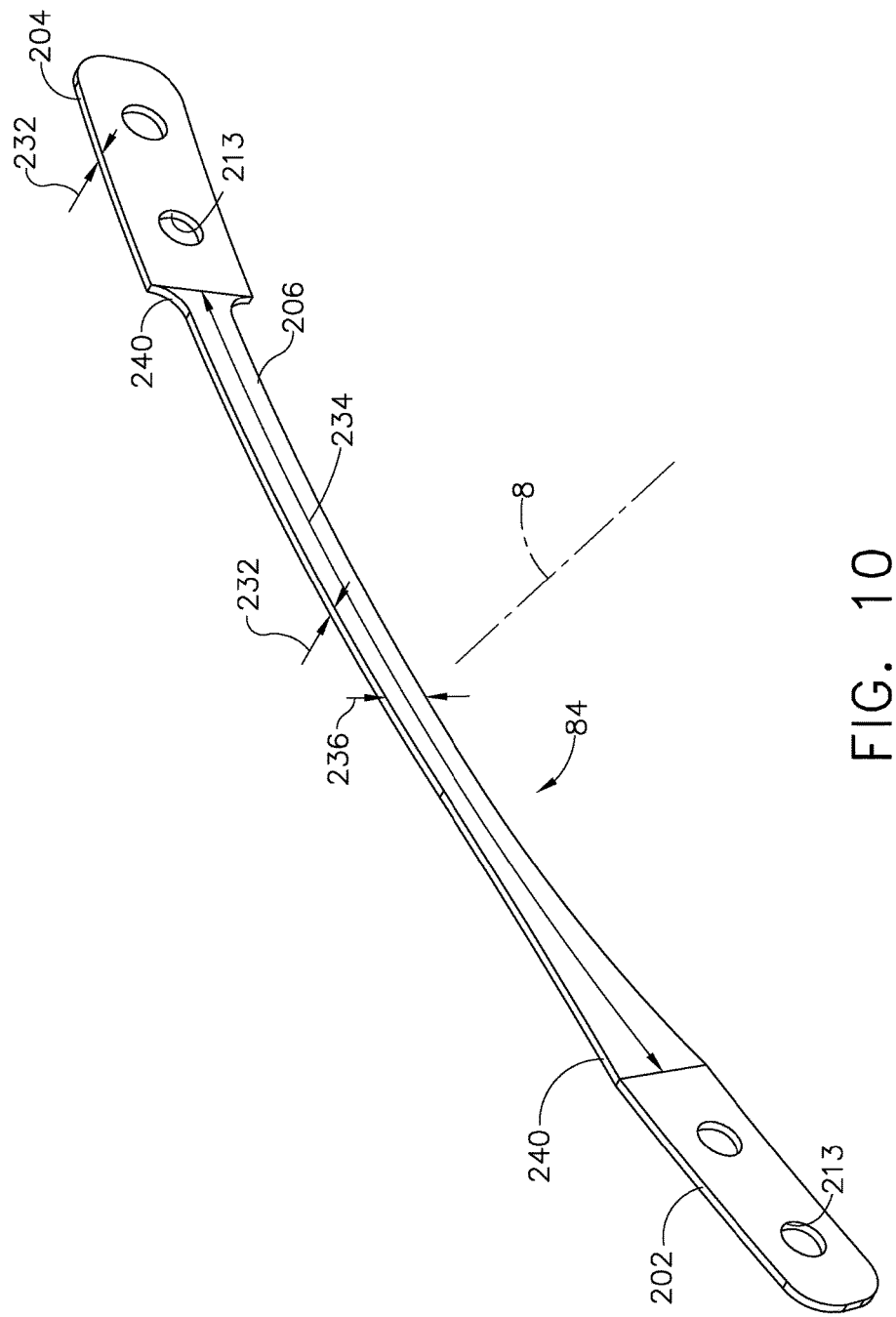
FIG. 10 is a perspective view illustration of an embodiment of the retraction leaf spring with a tapered configuration of the middle portion illustrated in FIG. 2.

A slotted embodiment of the leaf spring 84 illustrated in FIG. 9 includes a large height 236 middle portion 206 with a slotted or lattice structure 242 may be designed to increase radial stiffness while maintaining low axial stiffness and low weight. The height 236 of the middle portion 206 is greater than the height 236 of the first and second ends 202, 204. Sizing and arrangement of the slotted or lattice structure 242 in an otherwise solid middle portion 206 may be used to tune the leaf spring 84 stiffness and vibratory response. A tapered embodiment of the leaf spring 84 illustrated in FIG. 10 includes a variable height 236 in the middle portion 206 designed to tune radial and axial stiffness over an expected range of travel between the first and second ends 202, 204 as the slider 42 moves toward the rotatable face surface 125 on the rotatable member 104.

Figure 11:
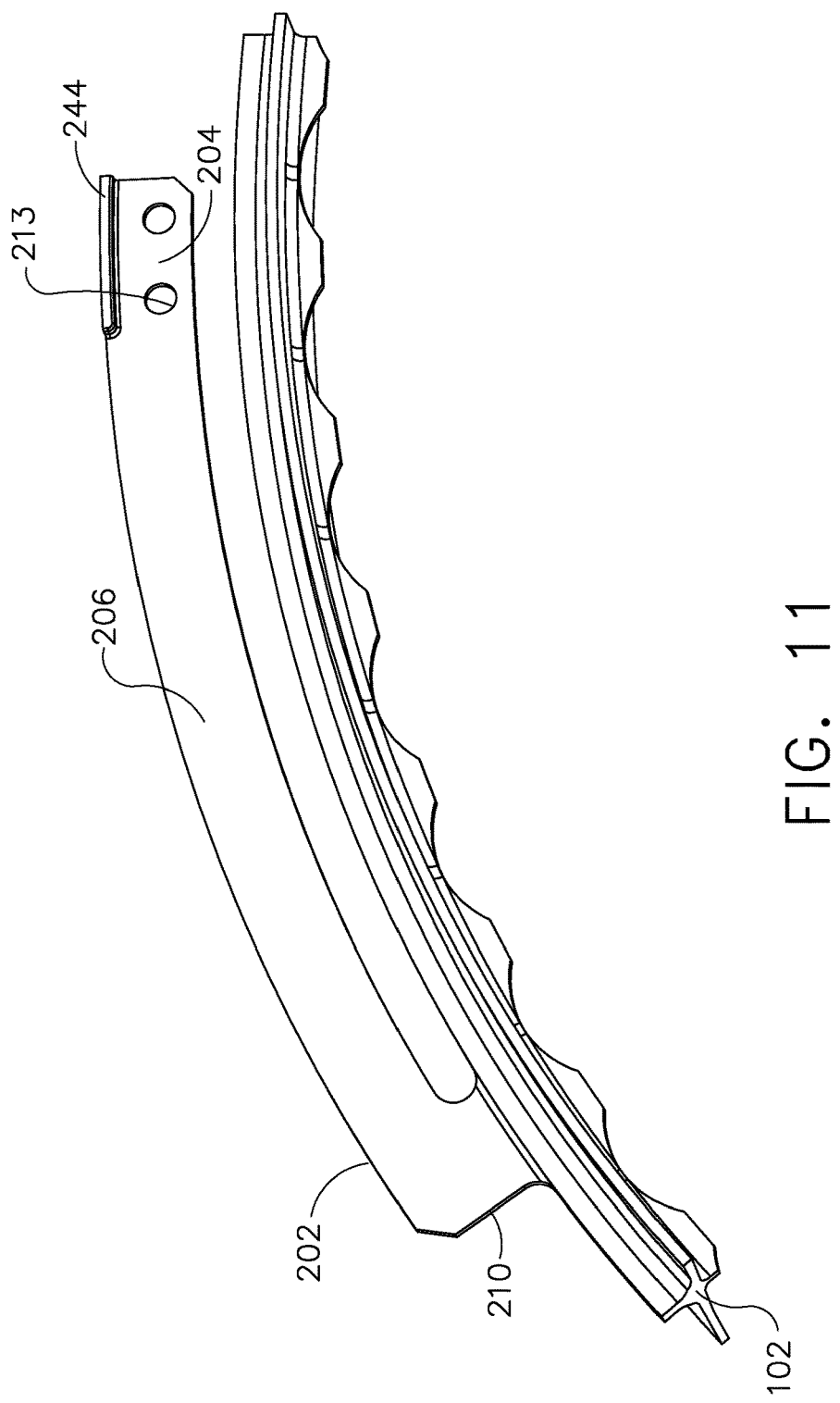
FIG. 11 is a perspective view illustration of an embodiment of a retraction flat spring illustrated in FIG. 2 integral with a non-rotatable member of the aspirating face seal.

An integral embodiment of the non-conical spring 84 illustrated in FIG. 11 includes leaf spring 84 integrated and being monolithic with support structure for the spring which in the embodiment illustrated herein is the non-rotatable member 102. The integral leaf spring 84 includes first end 202 integral and monolithic with first mounting lug or tab 210. The integral mounting lug or tab 210 is integral and monolithic with the non-rotatable member 102. The first and second ends 202, 204 and middle portion 206 therebetween are all integral and monolithic. Bolt holes 213 in the second end 204 are used to mount or attach the second end 204 to the second mounting lug or tab 214 on or attached to the slider 42. A locating tab 244 extends aftwardly from the second end 204 and is located radially outwardly of the bolt holes 213. The locating tab 244 is designed to rest or interact with the second mounting tab 214 which provides slider concentricity. The integral leaf spring 84 is designed to eliminate a bolted joint, simplify assembly, reduce weight, and reduce part count.

Figure 12:
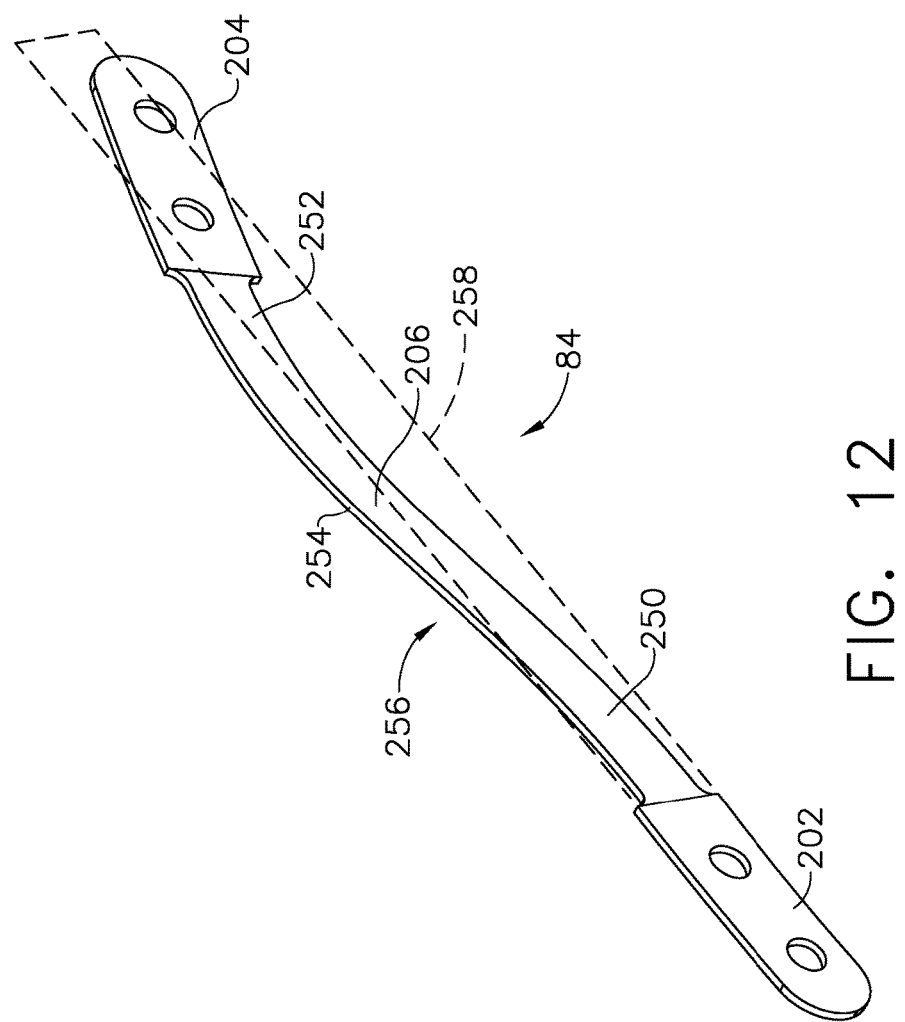
FIG. 12 is a perspective view illustration of an embodiment of the retraction leaf spring with an S-shaped configuration of the middle portion illustrated in FIG. 2.

An S-shaped embodiment of the leaf spring 84 illustrated in FIG. 12 includes an S-shaped middle portion 206 extending circumferentially between first and second ends 202, 204. The S-shaped middle portion 206 includes an axially forwardly bowed section 250 connected to an axially aftwardly bowed section 252 and an inflection point 254 therebetween. The S-shaped flat spring 84 is used to preload the slider 42 against the support structure for the spring which in the embodiment illustrated herein is the non-rotatable member 102 and provides lift-off force to retract the slider 42 after engine shutdown. The S-shaped spring 84 is illustrated in a free-state shape 256 shown in solid lines, and its straight assembly installed condition shape 258 is illustrated in dashed lines.

Figure 13:
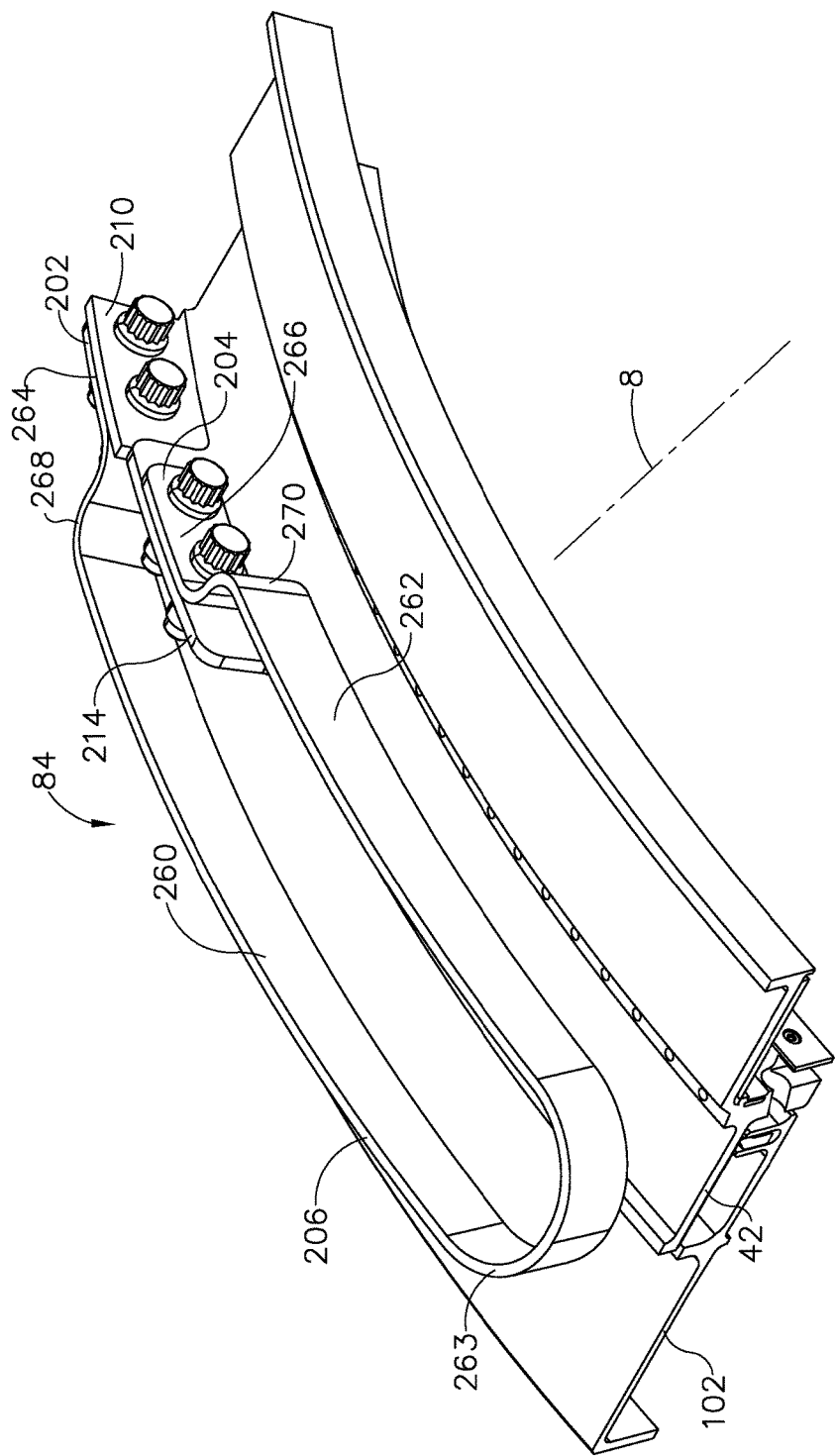
FIG. 13 is a perspective illustration of a hairpin spring embodiment of the non-coiled spring illustrated in FIG. 2.

The retracting means 82 may include a hairpin spring 84 illustrated in FIG. 13. The hairpin spring 84 includes a double leg U-shaped middle portion 206 extending circumferentially between first and second ends 202, 204. The double leg U-shaped middle portion 206 includes a circumferentially extending forward first leg 260 connected to the first end 202 and a circumferentially extending aft second leg 262 connected to the second end 204. A U-bend 263 is disposed between and connects the first and second legs 260, 262. The first and second legs 260, 262 may be substantially flat. The first and second legs 260, 262 may be curved, arced, or circumscribed about the centerline axis 8. The first end 202 is mounted on or attached to a first mounting lug or tab 210 on or attached to the non-rotatable member 102. The second end 204 is mounted on or attached to a second mounting lug or tab 214 on or attached to the slider 42. The first and second ends 202, 204 include first and second flat portions 264, 266 connected to the first and second legs 260, 262 by first and second S-bends 268, 270 respectively. The first and second flat portions 264, 266 are radially spaced apart from their respective first and second legs 260, 262 and the first and second S-bends help position them. The hairpin spring 84 is designed to eliminate slider rotation about the engine centerline axis 8. The hairpin spring 84 may allow for reduced bolt flange heights, in the radial direction, of the first and second mounting lugs or tabs 210, 214.

Diagrammatically illustrated in FIG. 13A is a first exemplary arrangement of the hairpin springs 84 which are all aligned in the same circumferential direction with the U-bends 263 of first ones of circumferentially adjacent springs facing the first and second ends 202, 204 of second ones of circumferentially adjacent springs.

Diagrammatically illustrated in FIG. 13B is a second exemplary arrangement of the hairpin springs 84 in which circumferentially adjacent springs 84 are aligned in opposite circumferential directions with the U-bends 263 of circumferentially adjacent springs facing each other and in opposite circumferential directions.

A U-shaped embodiment of the non-coiled spring 84 is illustrated in FIGS. 14 and 14A and includes a double leg U-shaped middle portion 206 extending radially away from the non-rotatable member 102 and the slider 42. A U-shaped middle portion 206 includes radially extending and substantially straight forward first leg 260 connected to a first end 202 and a radially extending aft second leg 262 connected to a second end 204 of the U-shaped spring 84. The first and second legs 260, 262 are axially spaced apart and a U-bend 263 is disposed between and connects the first and second legs 260, 262. The first end 202 is mounted on or attached to a first mounting lug or tab 210 extending radially outwardly from and attached to the non-rotatable member 102. The second end 204 is mounted on or attached to a second mounting lug or tab 214 extending radially outwardly from and attached to the slider 42. The first and second mounting lugs or tabs 210, 214 are preferentially axially aligned. The U-shaped spring 84 is designed to provide high radial and circumferential stiffness while maintaining low axial stiffness.

FIGS. 14B and 14C illustrate an alternative U-shaped embodiment of the non-coiled spring 84 having a forward leaning first leg 260. This U-shaped spring 84 includes a U-shaped middle portion 206 and a U-bend 263 connecting the forward leaning first leg 260 and straight radially extending second leg 262. The first and second legs 260, 262 are connected to the first and second ends 202, 262 respectively. This embodiment allows for a larger U-bend 263 between the first and second legs, which reduces stress in the U-bend, and improves the U-shaped spring buckling capability when the slider 42 is in the sealing position.

Figure 18:
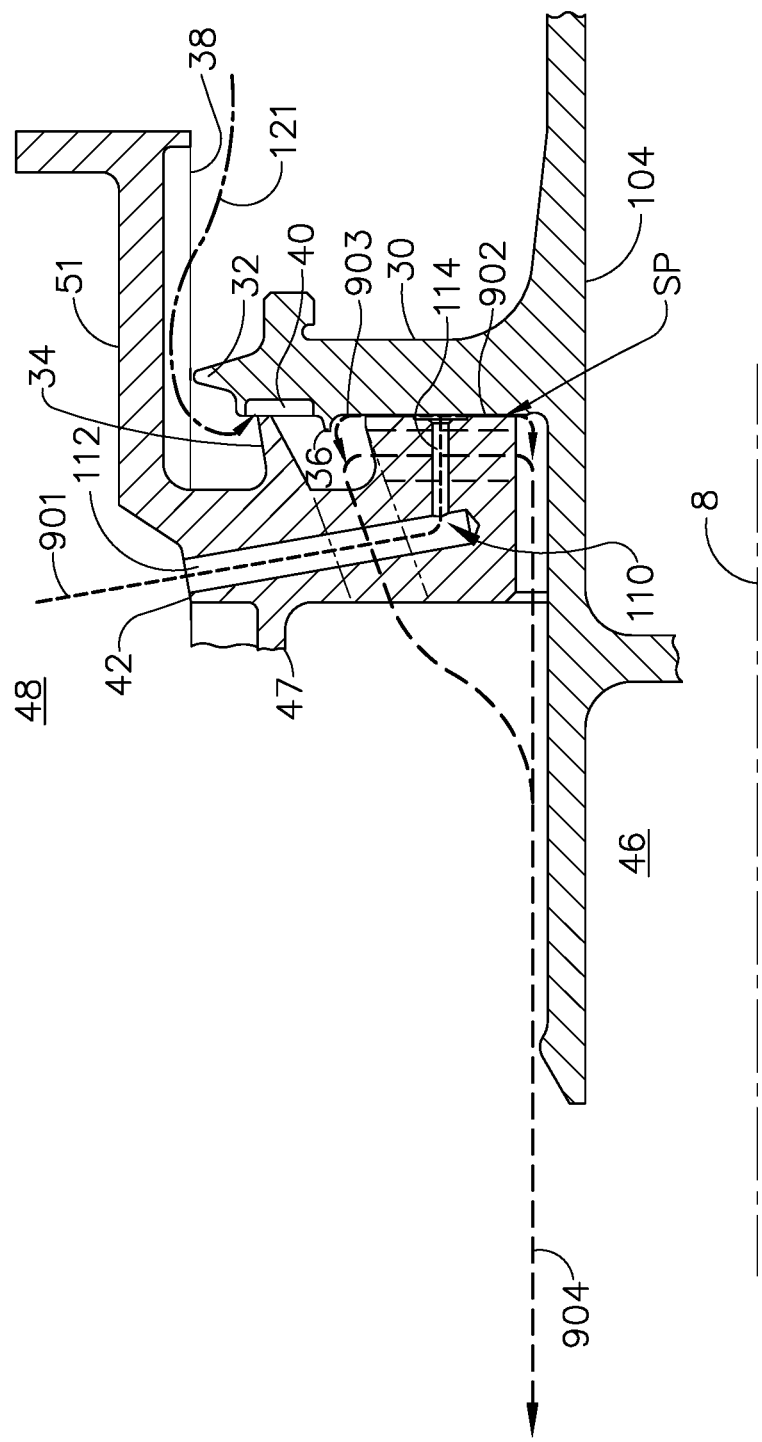
FIG. 18 is a cross-sectional view illustration of an alternative aspirating gas bearing face seal with a primary seal tooth mounted on an annular slider and starter and deflector seal teeth mounted on a rotatable member of the aspirating gas bearing.
Figure 19:
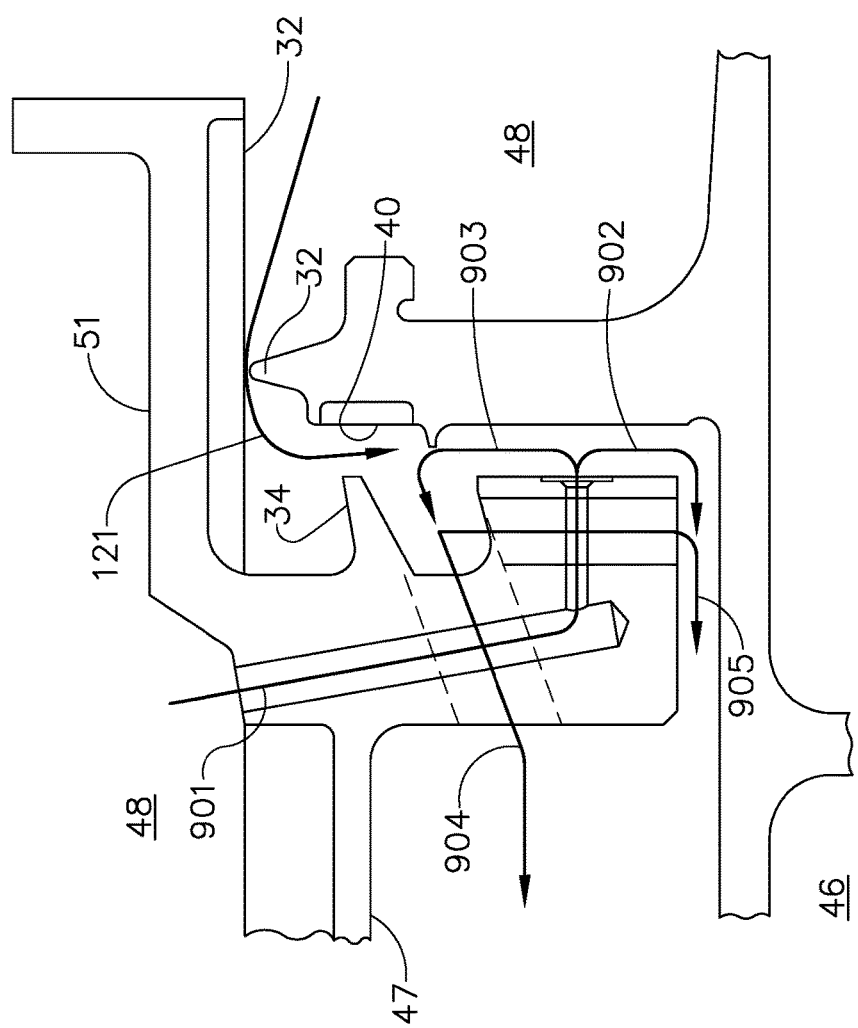
FIG. 19 is a cross-sectional view illustration of flows through the aspirating gas bearing face seal illustrated in FIG. 18 in a partially open position.
Figure 20:
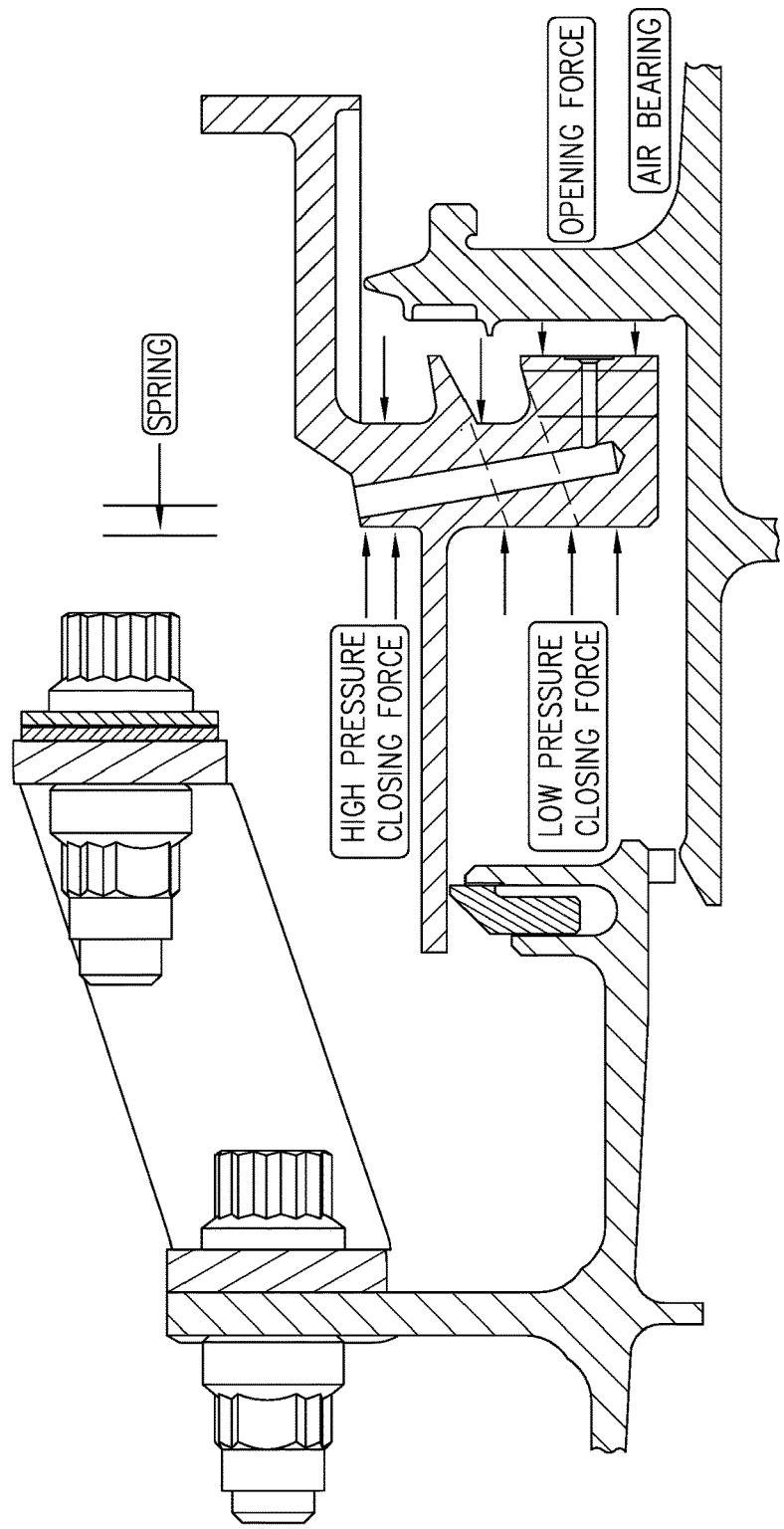
FIG. 20 is a diagrammatical illustration of forces acting on the aspirating gas bearing face seal illustrated in FIG. 18.

An alternative embodiment of the aspirating face seal 16 illustrated in FIGS. 18-20 includes a rotatable seal teeth carrier 30 in the form of a flange on the rotatable member 104. The rotatable face surface 125 is on the carrier 30. The primary seal tooth 34 is mounted on an annular slider 42 instead of the rotatable seal teeth carrier 30 on the rotatable member 104 as the embodiment illustrated in FIGS. 1 and 3. The starter and deflector seal teeth 32, 36 are mounted radially outwardly of the rotatable face surface 125 on the seal teeth carrier 30.

The primary and starter seal teeth 34, 32 are annular labyrinth seal teeth designed and operable to engage corresponding abradable primary and starter seal lands 40, 38. The primary seal land 40 faces axially forwardly from and is mounted on the seal teeth carrier 30. The primary seal land 40 located radially outwardly of the rotatable face surface 125 and the deflector seal tooth 36. The primary seal tooth 34 extends axially aftwardly from the annular slider 42 radially between the aft extension 51 and the central ring 45 of the annular slider 42. The deflector seal tooth 36 extends axially aftwardly from the seal teeth carrier 30. The starter seal tooth 32 extends substantially radially from the teeth carrier 30 and substantially normal to the centerline axis 8 of the engine 10.

The non-coiled spring 84 illustrated in FIGS. 2-12 may be referred to as leaf springs because they have a substantially straight middle portion 206 extending circumferentially between first and second ends 202, 204. The hairpin spring 84, illustrated in FIG. 13, includes two straight legs in the double leg U-shaped middle portion 206. The U-shaped flat spring embodiment of the flat spring 84, illustrated in FIGS. 14 and 14A, includes radially extending straight forward first and aft second legs 260, 262.

Referring to FIG. 2, the springs 84 are arranged or oriented to retract the slider 42 if the slider contacts or rubs the rotatable member 104, thus, clearing the rub. When the slider 42 closes (moves aft), the leaf spring 84 flexes at the bracket 208, causing the slider 42 to rotate counter clockwise CCW from an aft looking forward ALF perspective about the centerline axis 8. This in turn results in the second end 204 attached to the slider 42 to move closer to the first end 202 of the leaf spring 84 mounted by the bracket 208 attached to the non-rotatable member 102.

When the slider 42 retracts (moves forward), the opposite occurs and the slider 42 rotates clockwise CW from an aft looking forward ALF perspective about the centerline axis 8. This in turn results in the second end 204 moving away from the first end 202 of the leaf spring 84.

Figure 2A:
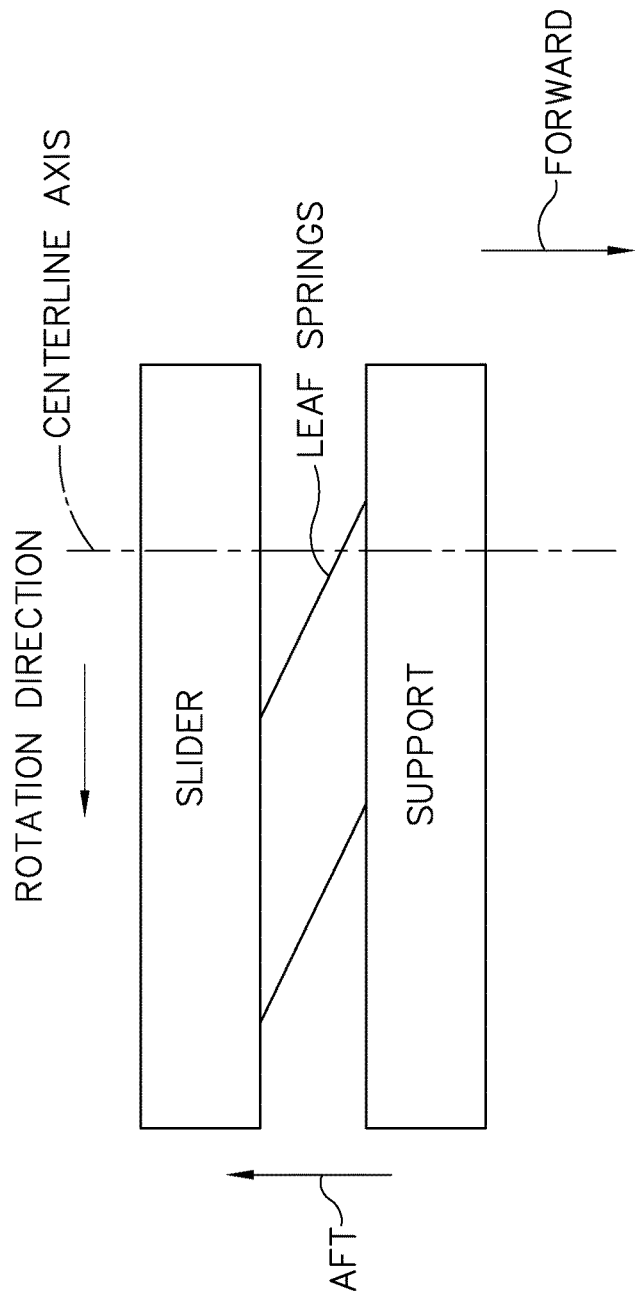
FIG. 2A is a diagrammatical view illustration of the retraction leaf springs orientation in the aspirating gas bearing face seal illustrated in FIG. 2.

FIG. 2A diagrammatically illustrates the arrangement and orientation of the springs 84 with respect to a support illustrated herein as the non-rotatable member 102. The springs 84 are clocked in a rotor direction illustrated herein as the clockwise CW direction from an aft looking forward ALF perspective about the centerline axis 8.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A turbomachine aspirating face seal assembly comprising:
an aspirating face seal operable for restricting leakage of high pressure air from a relatively high pressure region of an engine to a relatively low pressure region of the engine between a non-rotatable member of the engine and a rotatable member of the engine,
the rotatable and non rotatable engine members including gas bearing rotatable and non rotatable face surfaces respectively,
the non-rotatable face surface on an annular slider axially slidingly mounted on the non rotatable engine member,
a retracting means for retracting the annular slider away from the rotatable member and the non-rotatable face surface away from the rotatable surface,
the retracting means including a plurality of circumferentially spaced apart non-coiled springs, and
each of the springs axially disposed between the slider and the non rotatable engine member;
further comprising each of the springs being a leaf spring including first and second ends and a substantially flat and straight middle portion therebetween, the first and second ends mounted or attached to first and second mounting lugs or tabs on or attached to the non rotatable member and the slider respectively; and
further comprising bolt holes in the first and second ends and a thickness in the first and second ends greater than a thickness in the middle portion.

2. The seal assembly as claimed in claim 1 further comprising thick to thin transition sections between the middle portion the first and second ends.

3. A turbomachine aspirating face seal assembly comprising:
an aspirating face seal operable for restricting leakage of high pressure air from a relatively high pressure region of an engine to a relatively low pressure region of the engine between a non-rotatable member of the engine and a rotatable member of the engine,
the rotatable and non rotatable engine members including gas bearing rotatable and non rotatable face surfaces respectively,
the non-rotatable face surface on an annular slider axially slidingly mounted on the non rotatable engine member,
a retracting means for retracting the annular slider away from the rotatable member and the non-rotatable face surface away from the rotatable surface,
the retracting means including a plurality of circumferentially spaced apart non-coiled springs, and
each of the springs axially disposed between the slider and the non rotatable engine member;
further comprising each of the springs being a leaf spring including first and second ends and a substantially flat and straight middle portion therebetween, the first and second ends mounted or attached to first and second mounting lugs or tabs on or attached to the non rotatable member and the slider respectively; and
further comprising:
the first and second ends being diamond shaped,
the first and second ends having a greater height than the middle portion, and
the first and second ends and the middle portion having a uniform thickness.

4. A turbomachine aspirating face seal assembly comprising:
an aspirating face seal operable for restricting leakage of high pressure air from a relatively high pressure region of an engine to a relatively low pressure region of the engine between a non-rotatable member of the engine and a rotatable member of the engine,
the rotatable and non rotatable engine members including gas bearing rotatable and non rotatable face surfaces respectively,
the non-rotatable face surface on an annular slider axially slidingly mounted on the non rotatable engine member,
a retracting means for retracting the annular slider away from the rotatable member and the non-rotatable face surface away from the rotatable surface,
the retracting means including a plurality of circumferentially spaced apart non-coiled springs, and
each of the springs axially disposed between the slider and the non rotatable engine member;
further comprising each of the springs being a leaf spring including first and second ends and a substantially flat and straight middle portion therebetween, the first and second ends mounted or attached to first and second mounting lugs or tabs on or attached to the non rotatable member and the slider respectively; and
further comprising a slotted or lattice structure in the middle portion including slots in the middle portion.

5. The seal assembly as claimed in claim 4 further comprising the middle portion having a height greater than the first and second ends.

6. A turbomachine aspirating face seal assembly comprising:
an aspirating face seal operable for restricting leakage of high pressure air from a relatively high pressure region of an engine to a relatively low pressure region of the engine between a non-rotatable member of the engine and a rotatable member of the engine,
the rotatable and non rotatable engine members including gas bearing rotatable and non rotatable face surfaces respectively,
the non-rotatable face surface on an annular slider axially slidingly mounted on the non rotatable engine member,
a retracting means for retracting the annular slider away from the rotatable member and the non-rotatable face surface away from the rotatable surface,
the retracting means including a plurality of circumferentially spaced apart non-coiled springs, and
each of the springs axially disposed between the slider and the non rotatable engine member;
further comprising each of the springs being a leaf spring including first and second ends and a substantially flat and straight middle portion therebetween, the first and second ends mounted or attached to first and second mounting lugs or tabs on or attached to the non rotatable member and the slider respectively; and
further comprising:
the middle portion being tapered and having a variable height, and
the first and second ends and the middle portion having a uniform thickness.

7. A turbomachine aspirating face seal assembly comprising: an aspirating face seal operable for restricting leakage of high pressure air from a relatively high pressure region of an engine to a relatively low pressure region of the engine between a non-rotatable member of the engine and a rotatable member of the engine, the rotatable and non-rotatable engine members including gas bearing rotatable and non-rotatable face surfaces respectively, the non-rotatable face surface on an annular slider axially slidingly mounted on the non rotatable engine member, a retracting means for retracting the annular slider away from the rotatable member and the non-rotatable face surface away from the rotatable surface, the retracting means including a plurality of circumferentially spaced apart non-coiled springs, and each of the springs axially disposed between the slider and the non rotatable engine member: further comprising: each of the flat springs including first and second ends and a middle portion therebetween, the first and second ends and the middle portion being integral and monolithic with a first mounting lug or tab and the non rotatable member, and the first mounting lug or tab being on or attached to the non rotatable member: and further comprising a locating tab extends aftwardly from the second end and located radially outwardly of bolt holes in the second end.

8. A turbomachine aspirating face seal assembly comprising:
   an aspirating face seal operable for restricting leakage of high pressure air from a relatively high pressure region of an engine to a relatively low pressure region of the engine between a non-rotatable member of the engine and a rotatable member of the engine,
   the rotatable and non rotatable engine members including gas bearing rotatable and non rotatable face surfaces respectively,
   the non-rotatable face surface on an annular slider axially slidingly mounted on the non rotatable engine member,
   a retracting means for retracting the annular slider away from the rotatable member and the non-rotatable face surface away from the rotatable surface,
   the retracting means including a plurality of circumferentially spaced apart non-coiled springs, and
   each of the springs axially disposed between the slider and the non rotatable engine member;
   further comprising each of the springs being a leaf spring including first and second ends and a substantially flat and straight middle portion therebetween, the first and second ends mounted or attached to first and second mounting lugs or tabs on or attached to the non rotatable member and the slider respectively; and
   further comprising the middle portion including an S-shaped free state shape and an axially forwardly bowed section connected to an axially aftwardly bowed section and an inflection point therebetween.

9. A turbomachine aspirating face seal assembly comprising:
   an aspirating face seal operable for restricting leakage of high pressure air from a relatively high pressure region of an engine to a relatively low pressure region of the engine between a non-rotatable member of the engine and a rotatable member of the engine,
   the rotatable and non rotatable engine members including gas bearing rotatable and non rotatable face surfaces respectively,
   the non-rotatable face surface on an annular slider axially slidingly mounted on the non rotatable engine member,
   a retracting means for retracting the annular slider away from the rotatable member and the non-rotatable face surface away from the rotatable surface,
   the retracting means including a plurality of circumferentially spaced apart non-coiled springs, and
   each of the springs axially disposed between the slider and the non rotatable engine member;
   further comprising:
   the non-coiled springs being hairpin springs including first and second ends and a middle portion therebetween,
   the first and second ends mounted or attached to first and second mounting lugs or tabs on or attached to the non rotatable member and the slider respectively,
   the middle portion being a double leg U-shaped middle portion including a circumferentially extending forward first leg connected to the first end and a circumferentially extending aft second leg connected to the second end, and
   a U-bend disposed between and connecting the first and second legs.

10. The seal assembly as claimed in claim 9 further comprising the first and second ends including first and second flat portions connected to the first and second legs by first and second S-bends respectively.

11. The seal assembly as claimed in claim 9 further comprising the hairpin springs being all aligned in same circumferential direction with the U-bends of circumferentially adjacent first ones of the springs facing the first and second ends of second ones of the circumferentially adjacent springs or the circumferentially adjacent springs being aligned in opposite circumferential directions with the U-bends of the circumferentially adjacent springs facing each other and in opposite circumferential directions.

12. A turbomachine aspirating face seal assembly comprising:
   an aspirating face seal operable for restricting leakage of high pressure air from a relatively high pressure region of an engine to a relatively low pressure region of the engine between a non-rotatable member of the engine and a rotatable member of the engine,
   the rotatable and non rotatable engine members including gas bearing rotatable and non rotatable face surfaces respectively,
   the non-rotatable face surface on an annular slider axially slidingly mounted on the non rotatable engine member,
   a retracting means for retracting the annular slider away from the rotatable member and the non-rotatable face surface away from the rotatable surface,
   the retracting means including a plurality of circumferentially spaced apart non-coiled springs, and
   each of the springs axially disposed between the slider and the non rotatable engine member;
   further comprising each of the springs being a leaf spring including first and second ends and a substantially flat and straight middle portion therebetween, the first and second ends mounted or attached to first and second mounting lugs or tabs on or attached to the non rotatable member and the slider respectively; and
   further comprising:
   the middle portion being a double leg U-shaped middle portion including axially spaced apart radially extending forward first and aft second legs,
   a U-bend disposed between and connecting the first and second legs,
   the first mounting lug or tab extending radially outwardly from and attached to the non rotatable member, and
   the second mounting lug or tab extending radially outwardly from and attached to the slider.

13. The seal assembly as claimed in claim 12 further comprising the first and second mounting lugs or tabs being aligned.

14. A turbomachine aspirating face seal assembly comprising:

an aspirating face seal operable for restricting leakage of high pressure air from a relatively high pressure region of an engine to a relatively low pressure region of the engine between a non-rotatable member of the engine and a rotatable member of the engine, the rotatable and non rotatable engine members including gas bearing rotatable and non rotatable face surfaces respectively, the non-rotatable face surface on an annular slider axially slidingly mounted on the non rotatable engine member, a retracting means for retracting the annular slider away from the rotatable member and the non-rotatable face surface away from the rotatable surface, the retracting means including a plurality of circumferentially spaced apart non-coiled springs, and each of the springs axially disposed between the slider and the non rotatable engine member;

further comprising a secondary seal in sealing engagement with an annular radially inner slider surface of the annular slider in the low pressure region and the retracting means located radially outwardly of the annular slider in the high pressure region; and further comprising annular labyrinth primary and starter seal teeth mounted on a seal teeth carrier on the rotatable member designed and operable to sealingly engage corresponding abradable primary and starter seal lands respectively on the non rotatable member.

15. The seal assembly as claimed in claim 13 further comprising an annular labyrinth primary seal tooth mounted on the non rotatable member and an annular labyrinth starter seal tooth mounted on a seal teeth carrier on the rotatable member.

* * * * *